(12) United States Patent
Olsen

(10) Patent No.: US 9,044,824 B2
(45) Date of Patent: Jun. 2, 2015

(54) METHOD AND SYSTEM FOR LASER PROCESSING

(76) Inventor: Flemming Ove Olsen, Sorø (DK)

( * ) Notice: Subject to any disclaimer, the term of this patent is extended or adjusted under 35 U.S.C. 154(b) by 1281 days.

(21) Appl. No.: 12/312,118

(22) PCT Filed: Oct. 30, 2007

(86) PCT No.: PCT/DK2007/000462
§ 371 (c)(1),
(2), (4) Date: Apr. 27, 2009

(87) PCT Pub. No.: WO2008/052547
PCT Pub. Date: May 8, 2008

(65) Prior Publication Data
US 2010/0044353 A1     Feb. 25, 2010

Related U.S. Application Data

(60) Provisional application No. 60/907,296, filed on Mar. 28, 2007.

(30) Foreign Application Priority Data

Oct. 30, 2006 (DK) .................................. 2006 01399
Mar. 28, 2007 (EP) ...................................... 07388017
Oct. 10, 2007 (EP) ...................................... 07388073

(51) Int. Cl.
*B23K 26/00* (2014.01)
*B23K 26/06* (2014.01)
*B23K 26/26* (2014.01)

(52) U.S. Cl.
CPC ......... *B23K 26/0604* (2013.01); *B23K 26/0608* (2013.01); *B23K 26/26* (2013.01)

(58) Field of Classification Search
USPC ............... 219/121.6, 121.61, 121.64, 121.65, 219/121.66, 121.67, 121.69, 121.7, 121.71, 219/121.72, 121.73, 121.74, 121.85; 606/2, 606/3, 4–6, 10–12; 359/855, 865; 128/898; 331/94.5
See application file for complete search history.

(56) References Cited

U.S. PATENT DOCUMENTS 4,799,755 A * 1/1989 Jones ............................. 385/38
4,870,244 A * 9/1989 Copley et al. .............. 219/121.7
(Continued)

FOREIGN PATENT DOCUMENTS

DE     42 17 705 A1     12/1993
DE     43 16 829 A1     11/1994
(Continued)

OTHER PUBLICATIONS

"Time scale effects in laser material removal: a review", Y. Lawrence Yao; Hongqiang Chen; Wenwu Zhang. Nov. 24, 2004. Downloaded from http://spiedigitallibrary.org/.*
(Continued)

*Primary Examiner* — Thien S Tran
(74) *Attorney, Agent, or Firm* — Nath, Goldberg & Meyer; Jerald L. Meyer; Stanley N. Protigal

(57) ABSTRACT

The invention relates to laser cutting, using multiple laser beams directed to a processing region. At least one first laser beam (2) is coupled into the work piece (1) material to generate a melt (5) and to form a keyhole (3). At least one second beam (6) is guided onto selected surface regions (7) of the melt (5). The laser energy is provided to the processing region as individual beams that may be conditioned independently. The invention has the advantage that arbitrary energy distributions can be arranged in the processing region as determined according to the requirements of the laser cutting process, rather than being limited by an inappropriate beam shape of a single high power laser beam.

47 Claims, 27 Drawing Sheets

(56) References Cited

U.S. PATENT DOCUMENTS

| | | | |
|---|---|---|---|
| 5,690,845 A * | 11/1997 | Fuse | 219/121.74 |
| 5,728,993 A * | 3/1998 | O'Neill | 219/121.67 |
| 2004/0105092 A1* | 6/2004 | Iwata | 356/237.2 |
| 2005/0098260 A1* | 5/2005 | Chen | 156/272.8 |
| 2005/0236381 A1* | 10/2005 | Nomaru | 219/121.74 |
| 2006/0186098 A1 | 8/2006 | Caristan | |
| 2006/0289410 A1* | 12/2006 | Morita et al. | 219/121.67 |

FOREIGN PATENT DOCUMENTS

| | | |
|---|---|---|
| DE | 199 33 825 A1 | 2/2000 |
| EP | 0 481 270 A1 | 4/1992 |
| EP | 0 706 072 A2 | 4/1996 |
| EP | 1 637 919 A1 | 3/2006 |
| GB | 2 175 737 A | 12/1986 |
| JP | 03-018494 A | 1/1991 |
| JP | 04-344882 A | 12/1992 |
| JP | 2001-219285 A | 8/2001 |
| JP | 2001219285 A * | 8/2001 ............ B23K 26/00 |
| JP | 2002273588 A * | 9/2002 ............ B23K 26/00 |
| JP | 2004 358 521 A | 12/2004 |
| JP | 2004-358521 A | 12/2004 |
| JP | 2004358521 A * | 12/2004 ............ B23K 26/06 |
| JP | 2005-262251 A | 9/2005 |
| JP | 2005-303322 A | 10/2005 |
| JP | 2006-007304 A | 1/2006 |
| JP | 2006-066643 A | 3/2006 |
| JP | 2006-231363 A | 9/2006 |
| JP | 2006-263771 A | 10/2006 |

OTHER PUBLICATIONS

"Numerical Simulation of Pulsed Laser Ablation in Air", Bukuk OH; Dongsik Kim; Wonseok Jang; Bo-Sung Shin. 2003. Downloaded from http://spiedigitallibrary.org/.*

Translation of Notice of Rejection (Official Action) from corresponding Japanese Patent Application No. 2009-533665, mailed Sep. 18, 2012.

* cited by examiner

METHOD AND SYSTEM FOR LASER PROCESSING

This is a National Phase Application of PCT/DK2007/000462 filed Oct. 30, 2007 claiming priority from DK Application No. PA 2006 01399, filed 30 Oct. 2006, and from EP Application No. 07388017.1, filed 28 Mar. 2007 and from EP Application No. 07388073.4, filed 10 Oct. 2007 and claiming the benefit under 35 USC 119(e) of U.S. Provisional Application No. 60/907,296, filed 28 Mar. 2007, the entire content of which is hereby incorporated by reference in its entirety.

TECHNICAL FIELD

The present invention relates to a method and system for laser cutting of a work piece in a cutting direction using multiple laser beams guided to a processing region.

BACKGROUND ART

Laser processing, such as laser cutting and laser welding, is widely used for processing a variety of materials. The lasers typically used for laser processing are $CO_2$ lasers or Nd—YAG lasers.

As an example are lasers, such as $CO_2$ lasers or Nd—YAG lasers widely used for laser cutting virtually all kinds of material, irrespective if they are electrically conducting or non-conducting, hard or soft. A typical set-up for laser cutting comprises a laser, beam guidance and focussing optics, and means for moving the laser beam and the work piece with respect to each other. In a melt-and-blow-type process the laser cutting is aided by an assist gas jet through a nozzle which is concentrically arranged around the laser beam in order to blow the molten material out of the kerf.

However, the $CO_2$ laser has the disadvantage that the beam is strongly absorbed in plumes of metal vapour, readily ionizing molecules in the plume and thus generating even more absorbing plasma.

One major problem of the Nd—YAG laser is that it is difficult to manufacture a high power laser having a good beam quality as for example expressed by a low $M^2$ value.

Further, disc lasers and fibre lasers are known having a very low beam parameter product (BPP). However, power of known single mode fibre lasers is limited to less than 1000 W.

Cut depth and processing speed are determined by the energy absorbed by the work piece and the capability of removing the molten material from the kerf. In known laser cutting processes these challenges are met by increasing the laser power and the pressure of the assist gas. A number of limitations are encountered by this procedure.

One limitation is the formation of an excessive vaporisation plume within and out of the kerf, obscuring the optical path of the processing beam on its way to the cut-front. This is particularly the case for processes based on keyhole-formation. Absorption of laser energy by the vapour will lead to ionisation of molecules in the vapour generating even more absorbing plasma.

A further limitation of this procedure is that the assist gas suffers a pressure drop in the nozzle itself, in the region between the nozzle and the work piece surface, and on its way into and through the kerf. In deep kerfs it is therefore difficult to achieve an assist gas pressure at the bottom of the kerf that is sufficient to effectively remove the material molten by a melting beam. These limitations affect for example the cut quality, leading to defects, such as rough cutting edges or burrs. Some processes, for example laser cutting using $CO_2$-lasers may give a good cut-quality, however at a low cutting speed.

JP 2004 358 521 discloses a laser process, wherein a number of secondary beams is superimposed to a primary beam with substantially the same optical axis and focused to different levels within the work piece. The superimposed beams melt and evaporate material from the work piece, thereby forming a single keyhole. The work piece may be processed along a curve by displacing the work piece and the laser beams with respect to each other. By applying an assist gas the melt generated by the laser beams may be ejected from the work piece, thereby cutting the work piece along the curve.

U.S. Pat. No. 4,870,244 discloses a method for laser drilling or cutting using a first beam for partially melting a work piece and an accurately timed laser pulse from a Q-switched laser directed to the same spot as the first beam in order to create a detonation shock wave in the melt, thereby forcing at least part of the melt out of the processing region and away from the work piece. The disclosed method does not allow for viable high-speed cutting. The short and intense laser pulses from the Q-switched laser and the generated detonation wave tend to lead to substantial turbulences in the melt, strongly affecting the cutting speed and kerf quality. Furthermore, a system implementing the method will suffer from system complexity, amongst others requiring a Q-switched laser and a precise control device for controlling the firing of the laser pulse from the Q-switched laser.

DESCRIPTION OF THE INVENTION

Object of the invention is to provide a method for laser processing overcoming the above mentioned limitations.

This is according to the invention obtained by a method for laser processing using multiple laser beams, wherein at least one first laser beam, the so-called melting beam, is coupled into the work piece material to generate a melt and to form a keyhole, and at least one second laser beam, the so-called melt ejection beam, is guided onto selected surface regions of the melt, so as to evaporate material from the melt surface and provide a high pressure in a Knudsen-layer forcing at least part of the melt out of the processing region, thereby forming a kerf having a cut front and sidewalls. The high pressure in the Knudsen layer is preferably provided so as to provide a substantially steady flow of melt out of the processing region.

For the sake of simplicity the following terms are used to describe the laser process.

The laser processing is applied to a work piece or a number of abutting or overlapping work pieces along a processing curve by moving the laser beams with respect to the at least one work piece in a processing direction along said processing curve.

The at least one work piece is typically made of a sheet material that may be planar or have a curved or otherwise three-dimensional shape. The plane of the work piece at a given point on the work piece is defined as the tangential plane to the work piece in said point. The work piece surface normal in said point is defined as the corresponding normal vector on the tangential plane pointing in a direction away from the work piece.

In each point of the processing curve the tangent to the processing curve gives the corresponding processing direction for said point. The processing direction is parallel to the plane of the work piece surface and orthogonal to the corresponding work piece surface normal in said point.

The term "horizontal" refers to directions substantially parallel to the plane of the work piece. The term "longitudinal" refers to horizontal directions that are substantially parallel to the processing direction. The term "lateral" refers to arrangements characterised by a horizontal distribution of elements. The term "vertical" refers to directions substantially perpendicular to the plane of the work piece.

The at least one work piece has a first side facing a first half-space and a second side facing a second half-space. In this application, the first side is referred to as the front side, and the second side is referred to as the back side of the work piece. The first half-space is referred to as "upper" or "above" and the second half-space is referred to as "lower" or "below". Directions having a vector component pointing from the upper to the lower half-space are referred to as "downward", directions having a vector component pointing from the lower half-space to the upper half-space are referred to as "upward". Directions having a vector component parallel to the processing direction are referred to as "forward", and directions having a vector component that is anti-parallel to the processing direction are referred to as "backward".

By moving the multiple laser beams and the work piece with respect to each other the kerf is formed in a cutting direction along the cutting curve. Above mentioned definitions for laser processing apply correspondingly for laser cuffing.

The melting beam melts the work piece material at the cut-front. The melt is driven away from the cut-front and can flow in a downward direction out of the kerf and/or in a horizontal backward direction around the melting beam along the sidewalls of the kerf, eventually enclosing the melting beam.

By locally heating the surface of the melt with the melt ejection beam material is evaporated from the melt surface. The recoil of the particles thus forced to leave the surface of the melt generate a substantial gas pressure in immediate vicinity of the melt surface, in a layer which is known as the so-called Knudsen-layer. This evaporation-pressure drives the melt flow in the desired direction, effectively blowing the melt away and out of the kerf.

Advantageously according to the invention, the melt ejection beam can be guided to selected surface regions of the melt in order to generate and provide the evaporation-pressure right where it is required for driving the melt flow. To this end, the spatial distribution of the energy provided by the at least one melt ejection beam can be arranged by selecting a cross-sectional shape of the at least one melt-ejection beam, by shaping a cross-sectional power density distribution (beam profile), and/or by arranging a plurality of melt ejection sub-beams. For example, a melt ejection beam with a Gaussian beam profile may be chosen to have a diameter exceeding the melt pool width, such that the power density in the wings of the Gaussian beam profile lying outside the melt pool does not exceed the threshold for melting the solid work piece material while the remaining core of the Gaussian beam provides a power density sufficient to evaporate material from the melt surface in order to eject the melt from the kerf.

An important advantage of the laser cutting method according to the invention is that the melt flow from the cut front to the melt pool and out of the work piece is controlled by a careful arrangement of high intensity melting beams and melt ejection beams, whereby a steady melt flow is achieved. In practice, the surprisingly steady melt flow achieved by the laser cutting method according to the invention provides for an unprecedented cut quality, at high cutting speeds and when cutting through a thick work piece.

Other configurations for controlling melt flow and melt ejection with a more complex spatial distribution of the melt ejection power density can be conceived. Such configurations may comprise arrangements of multiple melt ejection sub-beams, including sub-beams with a non-Gaussian beam profile.

The laser power provided in the melting beam and the melt ejection beam may also be modulated in time in order to control the energy transferred to the work piece for melting, melt flow control and melt ejection. Both the at least one melting beam and the at least one melt ejection beam may be provided from continuous wave (cw) or pulsed laser sources.

The pressure provided by laser evaporation can by far exceed the pressure which can be achieved with assist gas inside a narrow kerf. The melt ejection in the method according to the invention is therefore more efficient than known processes employing assist gas ejection. The method according to the invention has the additional advantage that it allows for remote laser cutting without assist gas. In cases where assist gas is required in the process for other reasons, the process according to the invention at least reduces the consumption of assist gas substantially.

Preferably, the melt ejection beam is guided onto selected surface regions behind the melting beam, i.e. opposite to the cut-front, and will in practice be directed in a vertical direction or in a direction tilted slightly out of the vertical direction in order to remove the molten material from the kerf in a downward direction before it resolidifies. This arrangement is particularly advantageous for melt ejection at high cutting rates and/or in deep kerfs when the melt flow away from the cut-front occurs predominantly in a horizontal direction around the melting beam and along the sidewalls of the kerf.

Further according to the invention, the at least one melt ejection beam is provided so as to form a melt flow barrier extending transversely of the cutting direction and having a width essentially corresponding to the kerf to be formed.

In this embodiment, the melt ejection beam extends in a horizontal direction from one side of the melt to the other side, thus essentially covering the full width of the melt in a direction perpendicular to the processing direction.

During cutting operation the melt ejection beam interacts with the melt and a Knudsen-layer is formed at the melt surface where the melt ejection beam hits the melt.

The Knudsen-layer provides the local pressure for establishing and maintaining a melt surface extending throughout the whole thickness of the work piece. The Knudsen-layer thereby acts to substantially prevent melt from flowing further in the plane of the work piece and forms a horizontally confined melt pool propagating through the work piece along a cutting curve as processing proceeds.

Due to the horizontal confinement of the melt by the cut front, the work piece and the melt flow barrier provided by the melt ejection beam, the melt is forced to leave the processing region in directions out of the work piece plane in a downward and/or upward direction and a kerf is formed behind the melt pool.

Melt ejection in an upward direction is often undesirable in practice, as the upwardly ejected melt may contaminate for example the processing optics or in certain processing system configurations redeposit on the upper surface of the work piece. In a preferred embodiment, therefore additional pressure is applied from above to prevent the melt from escaping in an upward direction. The additional pressure may be provided by an assist gas or by at least one further melt ejection beam applied from above and essentially covering the melt pool. In the case, where leakage of melt through the barrier occurs, for example along the sidewall of the kerf, the surface covered by the at least one further melt ejection beam may be directed so as to extend in a backward direction in order to prevent upward ejection and/or provide a downward ejection pressure on the leakage melt. The additional pressure may also be provided as a combination of assist gas and an arrangement of at least one further melt ejection beam.

As mentioned above, confinement of the melt pool on the backside opposite to the cut front is established and maintained by means of a Knudsen-layer formed by the interaction of the melt ejection beam with the melt. In order to provide an effective barrier for the melt generated by the melting beam, the melt ejection beam should have enough power to provide a pressure in the Knudsen-layer corresponding to the pressure build up by the horizontal melt flow. The laser power density required for establishing and maintaining a blocking barrier may be called the blocking power density. The blocking power density depends on the stagnation pressure exerted by the melt flowing horizontally in a backward direction towards the melt ejection beam.

The at least one melt ejection beam forming the melt flow barrier may be tilted with respect to the vertical direction such as to point in a slightly backward direction and thereby to establish and maintain a Knudsen-layer providing a pressure with a component in a downward direction, thereby preferentially forcing the melt to leave the work piece in a downward direction rather than in an upward direction.

Further, according to the invention, at least one melt ejection beam is provided so as to form a melt flow barrier having an essentially concave surface on the side facing towards the melting beam. The concave melt flow barrier is adapted to "scrape" the melt off the sidewalls of the melt pool, preferably as close as possible to the solid-liquid interface between the melt pool and the solid work piece material, and to guide the melt flow towards the bottom of the concave surface in the centre.

The scraping effect comes about as the tips of the concave melt flow barrier pointing in a forward direction essentially block the flow of the melt along the sidewalls of the kerf. The melt flow is divided one part passing around the tip along the sidewalls leading to a leakage of melt around the barrier, and a second part of the melt flow that is deviated around the tip towards the centre line. The second part of the horizontal melt flow is then trapped by the concave barrier provided by the melt ejection beam and will tend to escape in directions out of the horizontal, i.e. in upward and downward directions away from work piece. Thereby a kerf is formed.

The smaller the diameter of the curvature at the tips, the closer to the solid-liquid interface between the melt and the solid work piece material the tips can be placed, thereby reducing the amount of leakage around the melt flow barrier and increasing the efficiency of the "scraping effect".

As mentioned above, in a preferred embodiment, the melt ejection may be forced in a downward direction by applying an additional pressure from above, wherein the additional pressure is provided by an assist gas and/or an arrangement of at least one further melt ejection beam.

The minimum power required for establishing a melt surface with a Knudsen-layer "sealing" the melt pool on the backside of the melt pool opposite to the cut front, is mainly determined by the rate melt is generated in the process. The power density of the barrier forming melt ejection beam therefore depends amongst others on the power density and polarisation of the melt ejection beam, the material properties of the work piece and the cutting velocity at which the work piece and the processing beams are moved with respect to each other. A power of the barrier forming melt ejection beam between 10% to 20% of the melting beam power may be sufficient. However, certain configurations may require larger powers of the melt ejection beam of up to 100% of the melting beam power.

Further, according to the invention, the melt flow barrier has a V-shaped cross-section.

In one advantageous embodiment according to the invention, the barrier is formed by a V-shape arrangement of overlapping sub-beams. The sub-beams may have a circular or elliptical cross-section. the sub-beams may be arranged in a V-shape configuration placed as a barrier across the melt with the bottom end of the V pointing in backward direction away from the cut front.

The individual sub-beams beam forming the melt flow barrier may be tilted with respect to the vertical direction such as to point in a slightly backward direction and thereby to establish and maintain a Knudsen-layer providing a pressure with a component in a downward direction, thereby preferentially forcing the melt to leave the work piece in a downward direction rather than in an upward direction.

In particular, the tilt-angle between the work-piece normal and the individual sub-beams may increase from the outermost beams towards the innermost beams. An arrangement of sub-beams with a gradual increase in the tilt angle from the edge towards the centre of the barrier acts to gradually redirect the melt flow from a mainly horizontal direction in a downward direction as the melt flow is "scraped" off the solid-liquid interface between the melt and the solid work piece material and guided towards the centre of the melt flow barrier, eventually ejecting the melt in a preferentially downward direction.

The individual sub-beams may also be inclined with an angle component in a plane perpendicular to the cutting direction. In particular in heavy sections through thick work pieces, there is a tendency of the melt pool in a downward direction to become narrower from the top towards the bottom. Furthermore, the scraping of the melt along the edges particularly by the outermost sub-beams may become less efficient as the laser beam propagates through the work piece. This effect can be compensated for by inclining in particular the outermost sub-beams to point in a direction with a component towards the solid-liquid interface.

The individual sub-beams forming the melt flow barrier may have different beam diameter. In particular the outermost sub-beams have preferably a beam-diameter that is as small as possible in order to come as close as possible to the solid-liquid interface for efficiently scraping the liquid melt off the solid work piece material.

In order to maintain the smallest possible beam diameter essentially throughout the depth of the work piece it is preferred that in particular the outermost sub-beams have a low beam-parameter product, for example as provided by fibre lasers or disc lasers.

In a further development of the above mentioned advantageous embodiment the outermost sub-beams are provided from frequency doubled, frequency-tripled and/or frequency quadrupled beams, thereby reducing the minimum achievable beam parameter product of the outermost sub-beams. Owing to the lower beam parameter product, a smaller beam diameter can be achieved for a given depth of focus required for processing a work piece of a given thickness. The depth of focus may be expressed in terms of the Rayleigh length. A practical condition for the depth of focus, but by no means limiting, is that twice the Rayleigh length essentially corresponds to the work piece thickness.

In another advantageous embodiment according to the invention the concave melt flow barrier is formed by a V-shape arrangement of overlapping sub-beams, comprising at least one first sub-beam having an oblong cross-section forming a first leg of the V-shape, and at least one second sub-beam having an oblong cross-section forming a second leg of the V-shape. This embodiment may be viewed as an arrangement of two light sheets, i.e. beams with an oblong, essentially line-shaped cross-section, where the planes of the light sheets are arranged at a mutual angle so as to form the above mentioned V-shape configuration placed as a barrier across the melt with the bottom end of the V pointing in backward direction away from the cut front.

In yet another advantageous embodiment according to the invention the at least one melt ejection beam forming the melt flow barrier is provided through a diffractive optical element (DOE). In this embodiment, the barrier is provided by directly shaping a laser beam to have a suitable beam profile by means of a diffractive optical element (DOE). In practice, the suitable beam profile may have the above mentioned concave configuration placed as a barrier across the melt with the bottom of the concave shape pointing in backward direction away from the cut front.

In a further development of the above mentioned advantageous embodiment the multiple laser beams for laser cutting including the at least one melting beam are provided using a single DOE, thereby reducing the complexity of the system for laser cutting. The multiple laser beams may be provided from a single laser source.

Further, according to the invention, further melt ejection beams are disposed to follow the at least one melt ejection beam in the cutting direction in a staggered arrangement, each further melt ejection beam forming a melt flow barrier extending transversely of the cutting direction and having a width essentially corresponding to the kerf to be formed. The staggered arrangement of barrier forming melt ejection beams is advantageous for improving the melt ejection and thereby the quality of the kerf side walls, because leakage through a first barrier forming melt ejection beam may be collected by one or more subsequent barrier(s) thereby reducing leakage of horizontal melt flow through the total arrangement of barriers.

Further, according to the invention, the at least one melt ejection beam comprises at least two melt ejection beams arranged to follow the melting beam along the sidewalls of the kerf. These melt ejection beams generate an evaporation pressure for ejecting at least a part of the melt flowing along the sidewalls of the kerf and provide an inwardly directed flow of melt. These laser beams can simultaneously act as trimming beams in order to thermally process the sidewalls of the kerf within the same step as cutting. The trimming beams allow for additional laser processing in order to avoid and/or remove burrs and striations, and in order to clean the cut-edges.

Further, according to the invention, at least two melt control beams are arranged to follow the melting beam along the sidewalls of the kerf and providing an inwardly directed flow of melt. The melt control beams thereby guide at least a part of the melt flow away from the sidewalls of the kerf towards the centre of the kerf.

In a further development of the above mentioned embodiment the at least two melt ejection beams arranged to follow the melting beam along the side of the melt pool and/or the melt control beams have a beam parameter product less than 10 mm*mrad, alternative less than 5 mm*mrad, alternative less than 1 mm*mrad, alternative less than 0.5 mm*mrad. Thereby it is achieved to bring the outermost tips of the barrier as close as possible to the solid-liquid interface between the liquid melt and the solid work piece material, thereby reducing the horizontal melt flow leakage along the sidewalls to a minimum. The at least two melt ejection beams and/or the melt control beams may also be placed across the solid-liquid interface to provide for trimming of the sidewalls of the kerf.

Lasers with the above-mentioned small beam parameter product are in this application referred to as high-intensity lasers. Examples thereof are disc lasers and fibre lasers.

Further, according to the invention, each of the at least two melt ejection beams and/or melt control beams has an instantaneous power fluctuating around an average power, wherein the deviation of the instantaneous power from the average power is essentially less than 10%, alternative less than 5%, alternative less than 1%, alternative less than 0.5% of the average power.

Further, according to the invention, each of the at least two melt ejection beams and/or melt control beams has an instantaneous spatial energy distribution fluctuating around an average energy density distribution, wherein the deviation of the instantaneous spatial energy density distribution from the average spatial energy density distribution in each point is less than 10%, alternative less than 5%, alternative less than 1%, alternative less than 0.5% of the average energy distribution in that point.

Examples for lasers satisfying the above mentioned stability criteria are disc lasers and in particular fibre lasers.

In an advantageous embodiment the at least two melt ejection beams and/or melt control beams are provided from a fibre laser or from a disc laser.

In a further development of the above embodiment the at least one melting beam and/or the at least one melt ejection beam has a beam parameter product less than 10 mm*mrad, alternative less than 5 mm*mrad, alternative less than 1 mm*mrad. In lasers characterised by such a low beam parameter product the laser energy can be concentrated onto a considerably smaller focal spot requiring less total power as compared to traditional lasers applied for cutting, yet achieving comparable or even higher intensities in the focal spot. Applying a laser with a low beam parameter product as a melting beam is advantageous for the melting process, since for a given laser power higher intensities can be achieved when focussing the laser to a focal spot. The thereby achieved higher intensity results in faster cut-front propagation. Furthermore, the keyhole formation can be achieved at smaller laser powers and with less plasma formation. A further advantage is that due to the smaller beam width a smaller kerf can be obtained. An efficient melt ejection from the narrow kerf is achieved by means of the melt ejection beam.

Modern fibre lasers can provide laser beams characterised by a low beam parameter product. Examples are single mode fibre lasers with a beam parameter product of 0.4 mm*mrad at wavelengths of 1 μm-1.5 μm, in practice typically 1.07 μm.

Further, according to the invention the at least one melting beam (2) and/or the at least one melt ejection beam (6) has an instantaneous power fluctuating around an average power, wherein the deviation of the instantaneous power from the average power is essentially less than 10%, alternative less than 5%, alternative less than 1%, alternative less than 0.5% of the average power.

Further, according to the invention the at least one melting beam (2) and/or the at least one melt ejection beam (6) has an instantaneous spatial power density distribution fluctuating around an average power density distribution, wherein the deviation of the instantaneous spatial power density distribution from the average spatial power density distribution in each point is less than 10%, alternative less than 5%, alternative less than 1%, alternative less than 0.5% of the average power density distribution in that point.

The beam quality and the stability of the spatial power density distribution across a laser beam may be defined in terms of the stability of the $M^2$ value. Advantageously at least some of the multiple laser beams used for carrying out the method according to the invention, have an $M^2$ value of less than 1.5, alternative less than 1.2, alternative less than 1.1, alternative less than 1.05, wherein a deviation of the instantaneous $M^2$ value from the average $M^2$ value is less than 20%, alternative less than 10%, alternative less than 5%, alternative less than 1% of the average $M^2$ value.

Laser noise, such as the noise induced by mode hopping or alike, may lead to fluctuations of the power and/or the spatial distribution of the energy provided by the laser. By using laser beams fulfilling the above mentioned beam quality and stability requirements for keyhole-forming beams, so-called micro-keyholes with an internal diameter of between 10 µm and 50 µm can be formed in the melt pool and maintained stable during the laser cutting process.

The micro-keyholes thus formed by melting beams and/or melt ejection beams guided to the processing region, and particularly in or at the edge of the melt pool act to effectively control and stabilise the melt flow and reduce turbulence in the melt flow, thereby providing clean cutting edges even at high cutting speed.

Examples for lasers satisfying the above mentioned stability criteria are disc lasers and in particular fibre lasers.

In a further development of the above embodiment at least the melting beam and/or the at least one melt ejection beam is provided by a fibre-laser or a disc laser.

Further according to one aspect of the invention, the melting beam comprises a number of laterally arranged sub-beams. A lateral arrangement of sub-beams allows for controlling the melt-formation and the melt-flow by adapting the beam intensity profile.

In a further development of the above embodiment each of the lateral sub-beams is adapted to generating a separate keyhole. For certain cutting applications it is desirable to have a wider melting zone. In such applications, rather than increasing the intensity and the beam width of a single beam, it can be advantageous to generate a number of laterally arranged smaller keyholes simultaneously within the same melt pool, because the lateral arrangement of keyholes acts to stabilize the melt flow. In such an arrangement, the beams forming the keyholes closest to the melt front mostly contribute to the melting of the solid work piece material, while the remaining beams are arranged to form keyholes within the melt pool for controlling and/or stabilizing the melt flow. In practice, these keyholes are formed as so-called micro-keyholes having a typical inner diameter of between 10 µm and 50 µm. The formation of micro-keyholes may be achieved by using laser beams with the above mentioned values for the beam parameter product (BPP), power stability and mode stability.

In an arrangement of smaller keyholes the melt flow path within each keyhole from the cut front to the melt pool behind the melting beam is shorter than in a corresponding single beam arrangement with the same melt pool size. As a consequence, the melt mass transport away from the cut-front is more efficient keeping the melt layer thickness at the cut-front low, thereby enhancing the coupling efficiency for coupling laser energy into the work piece material at the cut front, and thereby increasing the cutting speed. The lateral arrangement of keyholes in the melt pool also reduces turbulence in the melt pool, thereby stabilizing the melt flow.

Furthermore, the power within each of the lateral sub-beams is much smaller than in a corresponding single beam arrangement with the same melt pool size. The distributed keyhole formation therefore avoids excessive plasma formation as compared to a single beam arrangement.

Further according to the invention, the melting beam comprises a number of sub-beams that are longitudinally arranged essentially in line with the cutting direction and directed to the same keyhole.

In a further development of the above embodiment the focal spots of the longitudinally arranged sub-beams are arranged in different vertical levels of the work piece. In a vertical arrangement of melting sub-beams in the same keyhole the laser energy for melting and evaporation is vertically distributed over the cut-front. Vapour plume and plasma formation is thereby reduced and a high intensity can more easily be maintained down through the keyhole. Therefore higher penetration depths, higher cutting speed, and cleaner cuts are achieved by this arrangement as compared to known laser cutting methods.

In a further embodiment according to the invention the laser energy from at least one of the melting beams and/or melt ejection beams is provided in pulses. The pulses are provided at a rate so as to generate a steady melt flow.

In practice, the following combinations of melting beam characteristics and melt ejection beam characteristics may be contemplated. The below descriptions of the beam intensity profile are not to be understood strictly, but as to essentially describe the characteristics of the corresponding laser beam.

TABLE 1

| Beam characteristics | Melting beam | Melt ejection beam |
|---|---|---|
| Power mode | Continuous | Continuous |
|  | Continuous | Pulsed |
|  | Pulsed | Pulsed |
|  | Pulsed | Continuous |
| Beam intensity profile | Gaussian | Gaussian |
|  | Gaussian | Homogeneous |
|  | Gaussian | Homogeneous across kerf Other parallel to cutting direction |
| Beam cross-sectional shape (in the kerf) | Round | Round |
|  | Round | Rectangular |
|  | Round | Elliptic |

Further according to the invention, the at least one melting beam and/or the at least one melt ejection beam and/or melt control beam is linearly polarised. Employing linearly polarised light in a laser cutting method according to the invention allows for optimizing the coupling of the laser light into the material in accordance with requirements of a given application. A further advantage of using linearly polarised light is that a Faraday-isolator can be used to prevent back-reflected light from entering the transmitting fibres and/or the laser cavity.

In a preferred embodiment according to the invention, the at least one melting beam is linearly polarised in a direction parallel to the plane of incidence, wherein the plane of incidence at each instant is aligned with the direction of the cut. A melting beam that is linearly polarised parallel to the plane of incidence, i.e. with the electric field oscillating in the plane of incidence (p-polarisation), increases the laser energy coupled into the work piece material at the cut-front, thus enhancing cutting speed.

In another preferred embodiment according to the invention, the at least one melting beam is linearly polarised in a direction perpendicular to the plane of incidence, wherein the plane of incidence at each instant is aligned with the direction of the cut. A melting beam that is linearly polarised perpendicular to the plane of incidence, i.e. with the electric field oscillating perpendicular to the plane of incidence (s-polarisation), increases the laser energy coupled into the work piece material on either side of the melting beam, but not at the cut-front. An s-polarised melting beam therefore results in an increased kerf width at the expense of a reduced cutting speed.

Other orientations of the melting beam polarisation may be chosen resulting in energy absorption that is asymmetric with respect to the cutting direction. An asymmetric absorption will lead to a kerf that is inclined with respect to the direction of incidence of the at least one melting beam.

In a further embodiment according to the invention, the polarisation of the at least one melting beam is controlled as a function of the angle enclosed by the plane of incidence and the cutting direction and/or the angle of incidence, wherein the angle of incidence and the plane of incidence are defined with respect to the work piece surface normal.

For example, when cutting curves using a remote scanning system, the plane of incidence is often not parallel to the cutting direction. As a consequence, the melting beam will intersect the work piece at an angle with respect to the plane spanned by the cutting direction and the work piece surface normal, resulting in a tilted kerf. This artefact may be counteracted or even compensated for by controlling the polarisation angle as a function of the angle of incidence with respect to the work piece surface and/or the angle enclosed by the plane of incidence and the cutting direction, wherein the angle of incidence and the plane of incidence are defined with respect to the work piece surface normal.

Furthermore, linear polarisation of the melt ejection beam maybe used to optimise the coupling of the laser energy into the melt surface.

In a further embodiment according to the invention the at least one melt ejection beam is linearly polarised in a direction parallel to the plane of incidence (p-polarisation), wherein the plane of incidence is defined with respect to the work piece surface normal.

In a further embodiment according to the invention the at least one melt ejection beam is linearly polarised in a direction perpendicular to the plane of incidence (s-polarisation), wherein the plane of incidence is defined with respect to the work piece surface normal.

In a further embodiment according to the invention each melt ejection beam and/or melt control beam is linearly polarised at a fixed angle with respect to the plane of incidence, the absolute value of said angle being comprised between 0° and 90°, alternative between 30° and 60°, alternative between 40° and 50°, wherein the plane of incidence is defined with respect to the work piece surface normal.

A plurality of melt ejection sub-beams may be applied to the processing region in order to provide a desired power density distribution to selected surface regions of the melt. The melt surface may have a complicated curved three-dimensional shape. In order to optimise the coupling of the laser power into the selected melt surface regions for each individual sub-beam, it is of great advantage to adjust the polarisation of the melt ejection sub-beams. This may for example be done by adjusting the polarisation according to the local melt surface normal, i.e by adjusting the polarisation of a sub-beam according to the orientation of the selected surface region where the melt ejection sub-beam interacts with the melt. Each of two melt ejection beams following the melting beam along the sidewall of the kerf, where the plane of incidence of said melt ejection beams is parallel to the cutting direction may thus have a polarisation that is rotated to either side with respect to the cutting direction, respectively. The angle between the plane of incidence and the orientation of the polarisation may be chosen to be 45° to either side pointing into the material of the work piece in a forward direction.

In a further embodiment according to the invention, the polarisation of each melt ejection beam and/or melt control beam is controlled as a function of laser cutting process parameters, said laser cutting process parameters comprising the angle enclosed by the plane of incidence and the cutting direction and/or the angle of incidence, wherein the angle of incidence and the plane of incidence are defined with respect to the work piece surface normal.

The coupling of melt ejection laser power into the melt surface may directly or indirectly depend on further parameters of the laser cutting process. Therefore it is of great advantage to control the polarisation as a function of these process parameters either in a pre-programmed fashion or through feed-back from in-line process monitoring means, such as a camera, a photodiode, an array of optical sensors, or alike.

Combinations of the above mentioned arrangements for polarisation of the at least one melting beam and the at least one melt ejection beam may be contemplated. The advantage of said combinations is obvious to a person skilled in the art.

In a further embodiment of the invention the method comprises providing an assist gas jet directed towards the laser processing region.

Further according to the invention, a system for laser cutting of a work piece in a cutting direction comprises a laser beam emitting arrangement emitting a number of laser beams adapted to be guided to a processing region via at least one optical unit, and to be coupled into the work piece material, at least one first laser beam, the so-called melting beam, being adapted to melt the work piece material and form a keyhole, and at least one second laser beam, the so-called melt ejection beam, being adapted to heat selected surface regions of the melt, so as to evaporate material from the surface of the melt and provide a high pressure in a Knudsen-layer for forcing the melt out of the processing region, said system further comprising a motion arrangement for moving said laser beams relative to the work piece.

The high pressure in the Knudsen layer is preferably provided so as to provide a substantially steady flow of melt out of the processing region.

Said motion arrangement may comprise a stationary optics and means for moving the work piece, or a stationary work piece and means for moving the optics, or means for moving the optics and means for moving the work piece. Furthermore, the above mentioned motion means may be combined with a scanning optics, such as a system of computer-controlled actuator driven mirrors. The combination may be an arrangement of a scanning optics on a robotic arm or on a Cartesian gantry system.

Further, in a laser cutting system according to the invention, the at least one melt ejection beam comprises at least two melt ejection beams arranged to follow the melting beam along the sidewalls of the kerf.

Further, a laser cutting system according to the invention comprises at least two melt control beams arranged to follow the melting beam along the sidewalls of the kerf and provides an inwardly directed flow of the melt.

Further according to one aspect of the invention the laser beam emitting arrangement comprises at least two laser units each emitting a laser beam.

Further, according to one aspect of the invention, the laser beam emitting arrangement comprises at least one laser unit emitting a laser beam and a beam splitter splitting said beam into two or more beams.

In a further development of the above mentioned embodiment, the beam splitter is a cascading arrangement of beam splitter components. Using a cascading arrangement of beam splitter components a plurality of closely spaced or overlapping beams, such as a V-shape arrangement of multiple melt ejection sub-beams forming a melt flow barrier, may be produced in a simple and reliable manner.

Further, according to the invention, the laser beam emitting arrangement comprises at least one laser emitting a beam having a beam parameter product less than 10 mm*mrad, alternative less than 5 mm*mrad, alternative less than 1 mm*mrad, alternative less than 0.5 mm*mrad.

Providing the laser energy to the processing region as individual laser beams that may be conditioned independently has the advantage that arbitrary energy distributions can be arranged without compromising beam quality and intensity. The energy distribution provided to the processing region may thus be determined according to the requirements of the cutting process, rather than being limited by an inappropriate beam shape of a single high power laser beam. In practice it may be preferred to provide the individual laser beams from high intensity laser sources as characterised by the above mentioned beam parameter product ranges, such as single mode fibre lasers or disc lasers, as they allow for concentrating the available power onto spots close to the diffraction limit.

In a further development of the above mentioned embodiment according to the invention, at least one laser beam is provided by a fibre laser or a disc laser.

Further, a system according to the invention comprises means for providing an assist gas jet to the processing region.

Further, according to the invention, at least parts of the at least one optical unit are rotatable for collectively rotating the laser beams with respect to the at least one work piece around an axis which is perpendicular to the work piece surface at the processing region. In practice, the rotation axis may intersect the work piece at the cut-front or weld-front. In particular when laser processing is performed along curves, this embodiment has the advantage that the same arrangement of the beams is maintained with respect to the processing direction. A collective rotation of the laser beams with respect to the work piece can be achieved by an optical image rotator for rotating all laser beams around the same axis, or can be obtained by motion means, such as a robotic arm, for rotating the optical system, or a rotating work table, for rotating the work piece.

In a further embodiment of a system according to the invention the optical unit comprises at least one optical input port, beam collimating optics, means for collectively rotating the laser beams, and focusing optics arranged at an output end of the optical unit.

In a further embodiment of a system according to the invention the optical unit further comprises a beam splitter, such as a polarising beam splitter, polarisation rotating elements, and an optical isolator unit comprising at least one Faraday rotator and arranged between the collimating optics and the means for collectively rotating the laser beams.

In a further embodiment of a system according to the invention the optical unit further comprises means, such as a gas nozzle, for providing an assist gas jet directed to the processing region, said means for providing an assist gas jet being arranged concentrically around the laser beams at an output end of the optical unit.

In a further embodiment of a system according to the invention computer controlled scanning optics is arranged at the output end of the optical unit, said scanning optics being adapted to collectively deflect the laser beams emitted through the focussing optics. An example for such scanning optics is an arrangement of mirrors actuated by means of galvano-motors.

BRIEF DESCRIPTION OF THE DRAWINGS

The invention is now explained by exemplifying embodiments with reference to the drawings. The drawings show in FIG. 1 a cross-section through a multiple beam laser cutting process according to one embodiment of the invention, FIG. 2 a cross-section through a multiple beam laser cutting process according to another embodiment of the invention, FIG. 3 a cross-section through a multiple beam laser cutting process according to a further embodiment of the invention, FIG. 4 A top view of a laser cutting process according to a further embodiment of the invention with a V-shape arrangement of multiple circular melt ejection sub-beams.

BEST MODE(S) FOR CARRYING OUT THE INVENTION

Figure 1:
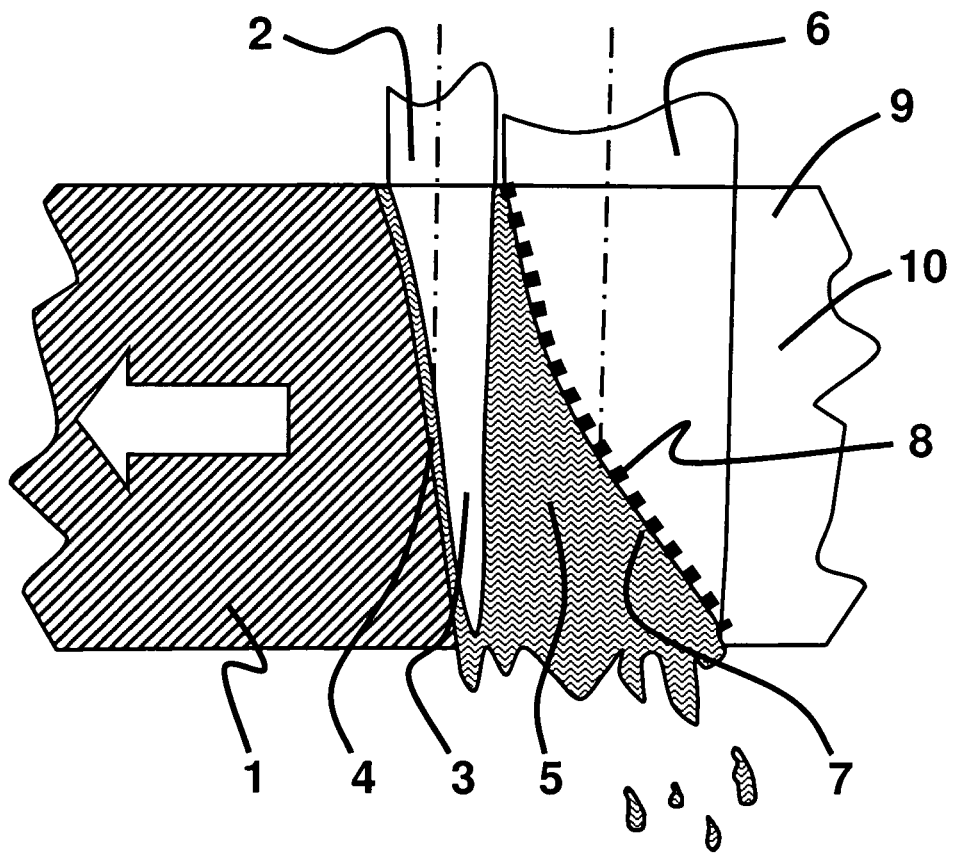

FIG. 1 shows a schematic cross-section for one embodiment of a laser cutting process according to the invention using two laser beams. A work piece 1 is exposed to a high intensity laser beam 2, the so-called melting beam, melting and evaporating some of the material from the work piece 1 thus forming a keyhole 3. Advancing the melting beam 2 in a cutting direction as indicated by the arrow in FIG. 1 makes a cut-front 4 propagating in that cutting direction. The melt 5 generated by the melting beam 2 flows around the melting beam 2.

A second laser beam 6, the so-called melt ejection beam, impinging on the melt surface 7 further heats the melt 5 within a thin layer from the surface 7 evaporating some of the material. In a thin layer above the melt surface 7, the so-called Knudsen-layer 8, the recoil force of the vapour molecules leaving the surface 7 generates a substantial evaporation pressure directed perpendicular to and into the surface 7. The evaporation pressure decays within a few mean free path lengths from the surface 7 corresponding to the thickness of the Knudsen-layer, due to collisions with other molecules in the gas phase surrounding the melt 5. The evaporation pressure acting on the melt surface 7 forces the melt 5 away from the selected surface region where the melt ejection beam 6 interacts with the melt 5. The melt 5 is thus forced to flow in a downward direction and eventually out of the work piece 1, thus removing material from the work piece 1 to form a kerf 9 with a cut-front 4 and sidewalls 10.

The cross-section of the melt ejection beam 6 may have a round shape, such as circular or elliptical, or an essentially quadrilateral shape, such as square, rectangular or trapezoidal.

The melt flow away from the cut-front 4 is predominantly horizontal along the sidewalls 10 of the kerf and merges behind the melting beam 2 to form a melt pool fully enclosing the melting beam 2. In the embodiment shown in FIG. 1 the melt ejection beam 6 is therefore directed downward onto a selected region of the melt surface 7 in a cutting direction behind the melting beam 2, i.e. opposite to the cut-front 4, in order to eject the melt 5 from the kerf 9 in a downward direction.

Figure 2:
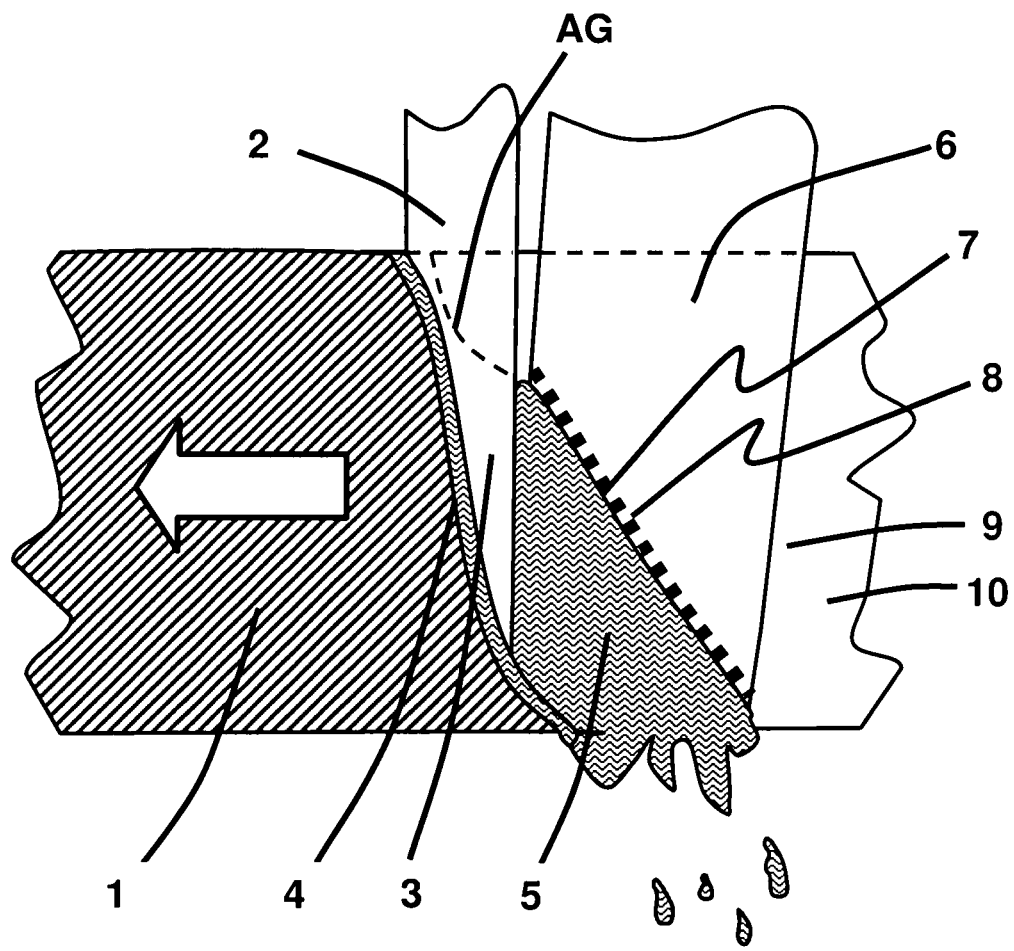

FIG. 2 shows a schematic cross-section for another embodiment of a laser cutting process according to the invention using two laser beams. In addition to the melt ejection beam 6 a supplementary assist gas jet is applied. The assist gas may be applied through a gas-nozzle arranged either off-axis with respect to the laser beams or, alternative, arranged essentially concentric around the laser beams. The assist gas applies an overall pressure to the melt 5 in addition to the melt ejection provided by the melt ejection beam 6 in the selected surface region of the melt surface 7. The assist gas forces the melt to flow downward as illustrated by the broken line AG in FIG. 2.

Figure 3:
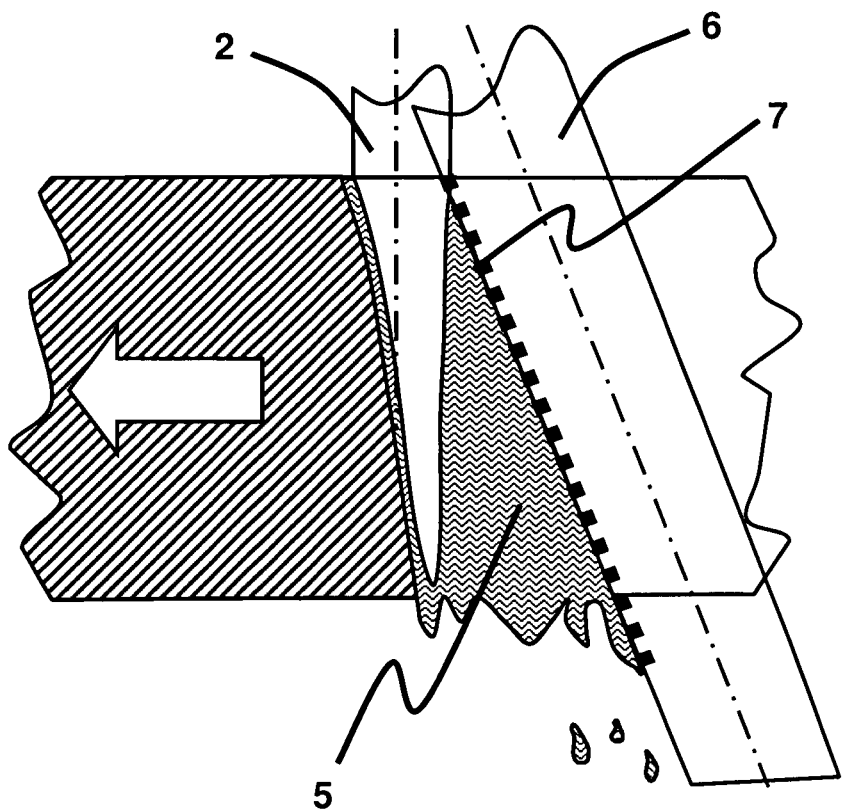

FIG. 3 shows a schematic cross-section of another embodiment of a keyhole laser cutting process according to the invention. The at least one melt ejection beam 6 is inclined with respect to the melting beam 2. The melt ejection beam 6 is directed downward and backward interacting with the surface of the melt 5 behind the melting beam 2 and establishing a melt surface 7 essentially parallel to the direction of the melt ejection beam. In practice, the diameter of the melt-ejection beam 6 will exceed the diameter of the melting beam 2 and cover the full width of the melt pool.

The cross-section of the melt ejection beam 6 may have a round shape, such as circular or elliptical, or an essentially quadrilateral shape, such as square, rectangular or trapezoidal.

FIGS. 4-8 each show a top view of a further embodiment of a laser cutting process according to the invention, wherein at least one melt ejection beam 6 is provided opposite to the cut front 4 so as to form a melt flow barrier extending in a direction perpendicular to the cutting direction and having a width essentially corresponding to the kerf 9 to be formed.

The melting beam 2 generates a melt at the cut front 4 which is established in front of the melting beam 2, as seen in the cutting direction indicated by the block arrow. The melt flows around the melting beam 2 and is trapped by a concavely shaped melt ejection beam 6. As a result a melt pool 5 is formed that is delimited by the cut front 4 in a forward direction, by the solid work piece material towards the sides and by the melt ejection beam 6 in a backward direction. In FIGS. 4-8 the melt flow in the melt pool 5 is indicated by small solid black arrows.

The melt ejection beam 6 blocks to a large degree the melt from flowing further in the plane of the work piece 1, and forces the melt to flow in a downward and/or upward direction, thereby ejecting the melt and creating a kerf 9.

Figure 4:
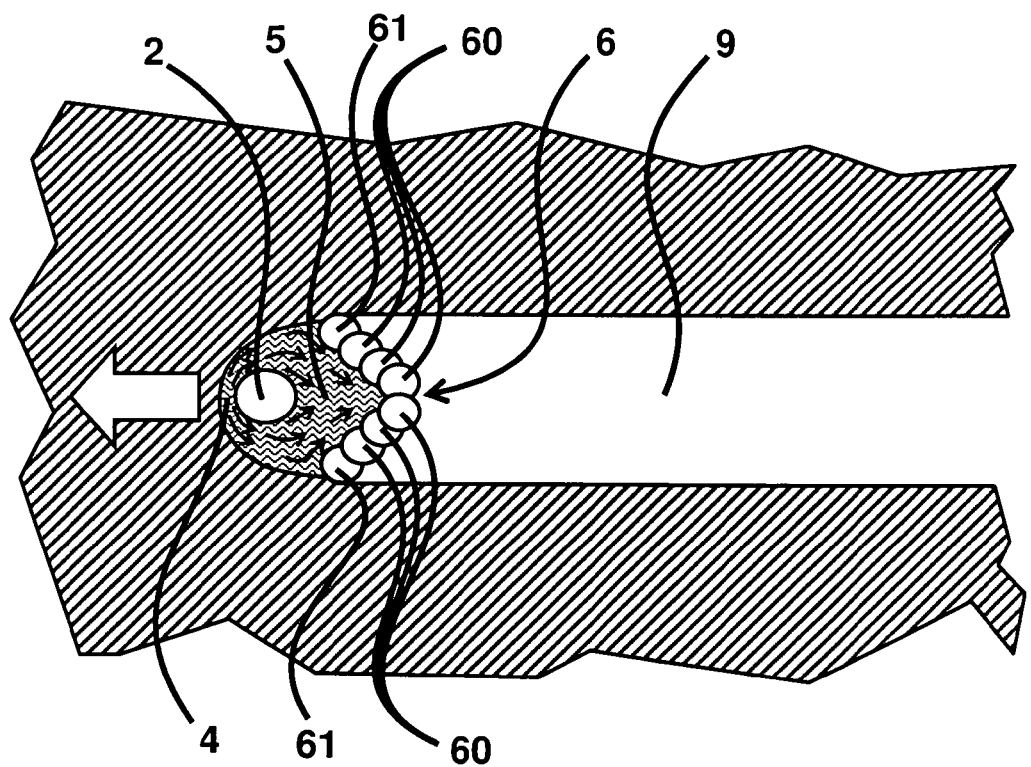

In the configuration shown in FIG. 4, the melt ejection beam 6 is a V-shape arrangement of eight overlapping sub-beams 60, 61, each being of essentially circular cross-section. The V-shape covers the full width of the melt pool 5, wherein the bottom of the V-shape is placed close to the centre-line pointing in a backward direction. The tips of the V-shape are formed by outermost melt ejection sub-beams 61 and are placed close to the solid-liquid interface in the sideward direction. The advantage of composing the melt flow barrier from a plurality of melt ejection sub-beams 60, 61 is that a large variety of melt ejection beam profiles can be generated with a maximum of flexibility with respect to adjusting processing parameters, such as for processing different kinds of materials, varying work piece thicknesses, varying processing speeds or alike.

The melt is "scraped off" the solid-liquid interface on the sides by the outermost sub-beams 61, guided towards the centre by the further sub-beams 60, and eventually trapped at the middle of the melt flow barrier. Due to the inwardly guiding effect of the outermost sub-beams 61, said sub-beam may also be considered as melt control beams, as described later on. As a consequence, the V-shape arrangement of melt ejection sub-beams 60, 61 leads to a melt ejection in an upward and in a downward direction.

Leakage of melt flow through the melt flow barrier 6, may arise, in particular around the outermost sub-beams 61, where the leaking melt mainly flows between the melt ejection sub-beam and the solid work piece material and eventually solidifies on the sidewalls 10 of the kerf 9.

Leakage is reduced by using laser beams with a small beam diameter, in particular for the outermost melt ejection sub-beams 61: The smaller the beam diameter of the outermost sub-beams 61 the more efficient the "scraping effect". Preferably, at least the outermost sub-beams 61 have therefore a small beam diameter. In order to maintain this small beam diameter throughout the depth of the work piece it is advantageous to provide at least the outermost sub-beams 61 from a laser source with a very low BPP, such as from a single mode fibre laser or a disc laser.

The melt ejection sub-beams 60, 61 may be arranged at an angle pointing in a downward and backward direction. In this way the melt flow barrier tends to direct the melt flow in a downward direction. The angle of inclination may gradually increase from the outermost beams 61 being aligned close to the vertical direction, towards the innermost beams 60.

Figure 5:
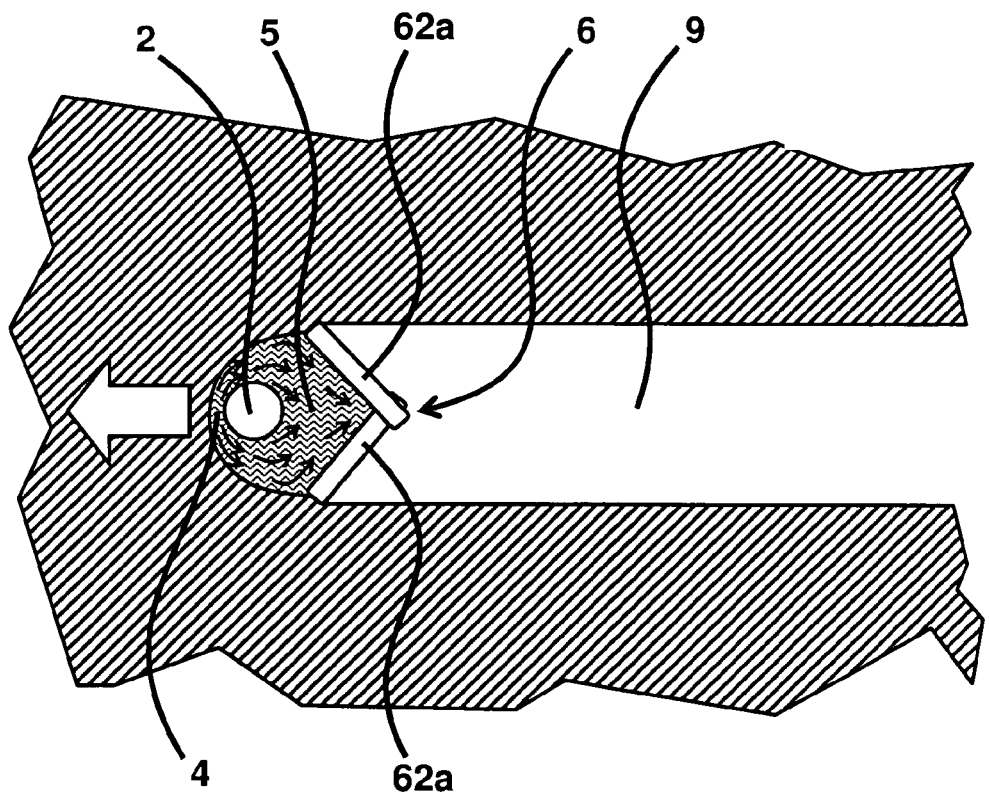
FIG. 5 A top view of a laser cutting process according to a further embodiment of the invention with a V-shape arrangement of two line-focus melt ejection sub-beams.

In the configuration shown in FIG. 5, the melt ejection beam 6 is a V-shape arrangement of two sub-beams 62 with a line-focus ("light-sheet"). As in the above mentioned embodiment, the V-shape covers the full width of the melt pool 5, wherein the bottom of the V-shape is placed close to the centre line and pointing in a backward direction. The advantage of this embodiment is that an effective melt flow barrier may be provided at a reduced complexity of the optical system.

Figure 6:
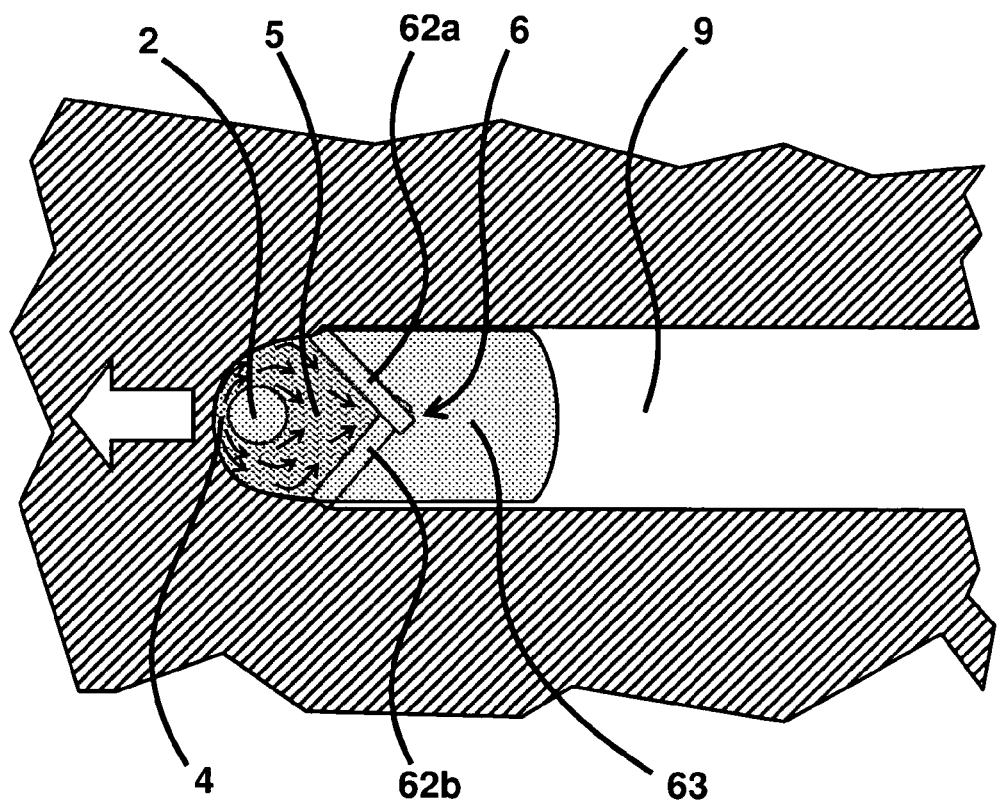
FIG. 6 A top view of a laser cutting process according to a further embodiment of the invention with a V-shape arrangement of two line-focus melt ejection sub-beams and with an additional melt ejection beam.

FIG. 6 shows a further embodiment according to the invention, wherein an additional melt ejection beam 63 is applied from above. The additional melt ejection beam 63 provides a pressure from above in order to eject the melt in a downward direction. The additional melt ejection beam 63 has preferably an essentially uniform power density distribution and covers the melt pool 5. The additional melt ejection beam 63 may extend in backward direction beyond the barrier formed by the melt ejection beam 6 in order to provide for melt ejection of melt leaking through the melt flow barrier formed by the melt ejection beam 6. Alternatively or as supplement to the additional melt ejection beam 63, the pressure from above may be provided by assist gas.

Figure 7:
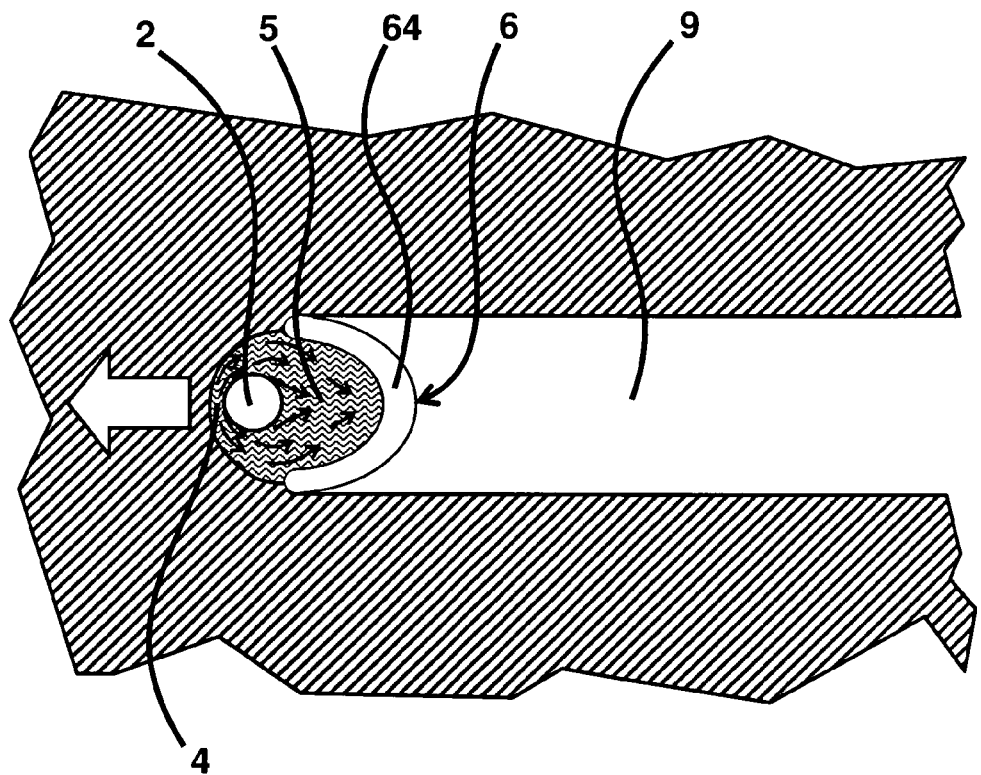
FIG. 7 A top view of a laser cutting process according to a further embodiment of the invention with a U-shape melt ejection beam.

In the configuration shown in FIG. 7, the melt ejection beam 6 is a beam with a U-shape cross-section 64. Such a U-shape cross-section 64 may be provided by means of a diffractive optical element (DOE). This has the advantage that melt ejection beam 6 with a complex cross-sectional beam profile may be provided by means of a simple optical set-up using a simple laser source reducing the need of sophisticated adjustment of multiple beams and increasing the stability of the process.

Figure 8:
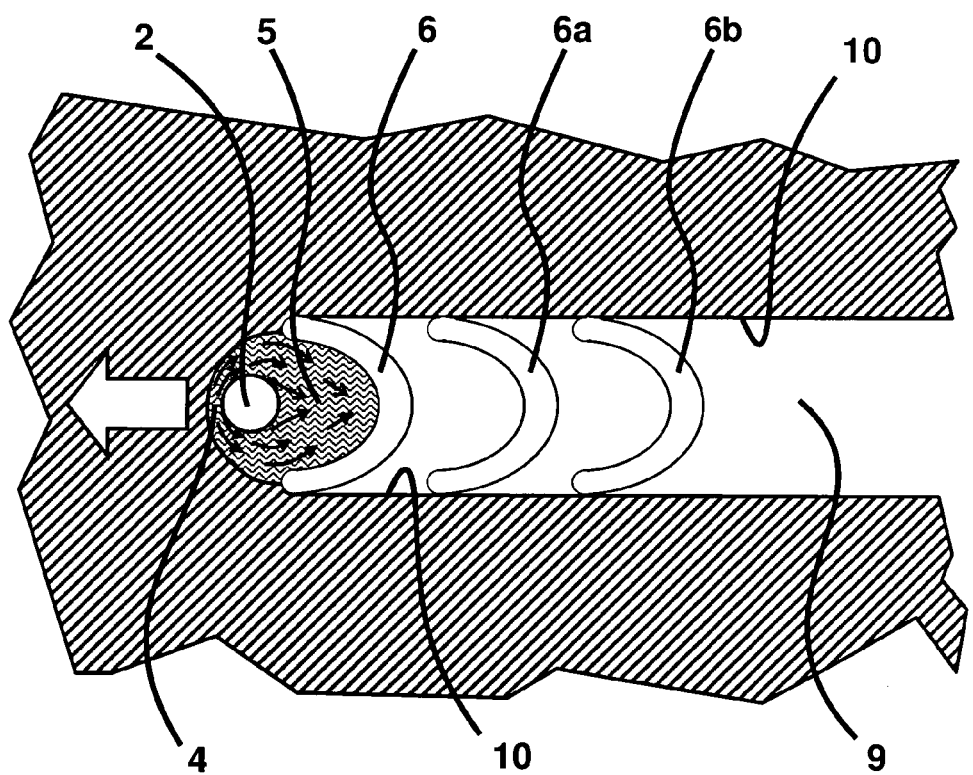
FIG. 8 A top view of a laser cutting process according to a further embodiment of the invention with a staggered arrangement of U-shape melt ejection beams.

FIG. 8 shows a further embodiment of a laser cutting process according to the invention, wherein further melt ejection beams 6a, 6b are disposed to follow the first melt ejection beam 6 in cutting direction so as to form a staggered arrangement of melt flow barriers. The further melt flow barriers collect and trap leakage melt and eject the same thus improving the quality of the kerf 9 formation. Advantageously the further melt ejection beams 6a, 6b are provided by optically replicating the melt ejection beam 6, e.g. in a beam splitter unit.

Figure 9:
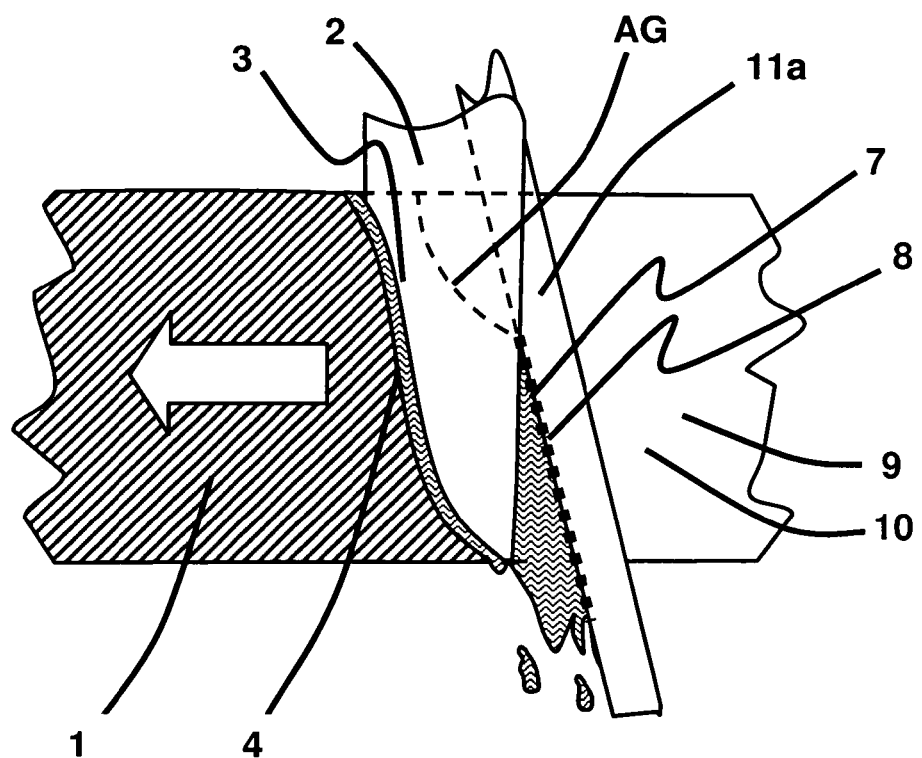
FIG. 9 a cross-section through a multiple beam laser cutting process according to a further embodiment of the invention, FIG. 10 a top view of a laser cutting process according to a further embodiment of the invention with melt control beams and a U-shape melt ejection beam.

FIG. 9 shows a schematic cross-section of another embodiment of a keyhole laser cutting process according to the invention using three laser beams. Rather than directing one large melt ejection beam 6 to the melt pool behind the melting beam 2, the embodiment shown in FIG. 9 provides two melt ejection beams 11a (shown) and 11b (not shown) that are guided along the sidewalls 10 and downward through the kerf 9. Laser energy of the melt ejection beams 11a, 11b is coupled into the melt 5 and provides an evaporation pressure in a Knudsen-layer 8 for ejecting the melt 5 from the kerf 9. In addition to ejecting the melt 5 the melt ejection beams 11a, 11b may also remove material from the sidewalls 10 to trim the cut edges.

The melt ejection beams 11a, 11b are comparable to or smaller in diameter as compared to the melting beam 2. The melt ejection beams 11, 11b may be arranged to overlap each other and/or the melt ejection may be further supported by the application of an assist gas. The assist gas may be applied off-axis, or through a concentric nozzle as described above.

Figure 10:
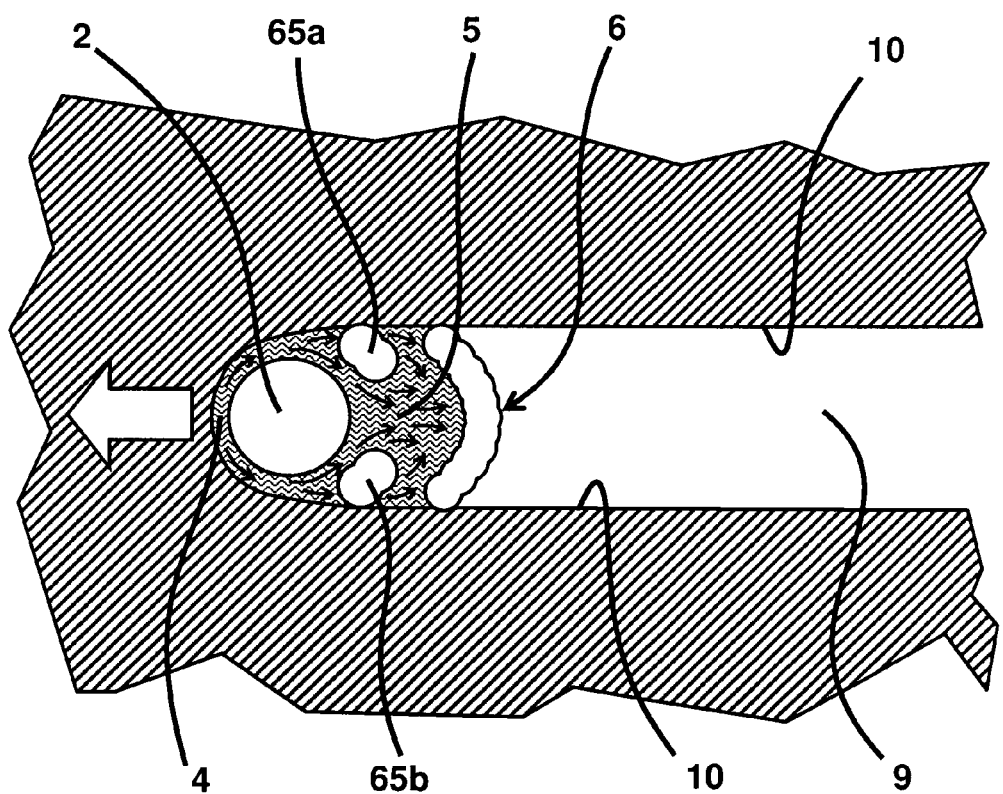

FIG. 10 shows a further advantageous embodiment of the invention, wherein melt control beams 65a, 65b guided along the sidewalls 10 of the kerf 9 are combined with a melt flow barrier provided by a melt ejection beam 6 according to any of the above mentioned embodiments. The melt control beams 65a, 65b may supplement a concave melt ejection beam as for example provided by a DOE. The melt control beams 65a, 65b are adapted to minimize the flow of melt along the kerf walls and provide an inwardly directed flow of melt as shown by the arrows. Alternatively, the melt control beams 65a, 65b guided along the sidewalls 10, the barrier forming melt ejection beam 6, and optionally also the melting beam 2 are provided using a single DOE.

The melt control beams 65a, 65b are preferably high-intensity beams with a beam-parameter product below 1 mm*mrad, alternative below 0.4 mm*mrad.

The high intensity melt control beams 65a, 65b may be focused to a very small beam-diameter and placed at the tips of the concave shape of the melt ejection beam 6 very close to or across the solid-liquid interface on the side of the melt pool. By this placement, the high intensity melt control beams 65a, 65b improve the collection of melt from the solid-liquid interface guiding the melt flow towards the centre line where it is trapped by the barrier formed by the melt ejection beam 6 as is in the above mentioned embodiments according to the invention. Furthermore, intensity, focus and the exact direction of the melt control beams 65a, 65b may be adjusted independent of the melt ejection beam 6 in order to provide for an optimum melt collection from the solid-liquid interface, thereby reducing the melt leakage around the tips of the melt ejection beam 6 barrier, and/or in order to trim the sidewalls 10.

Figure 11:
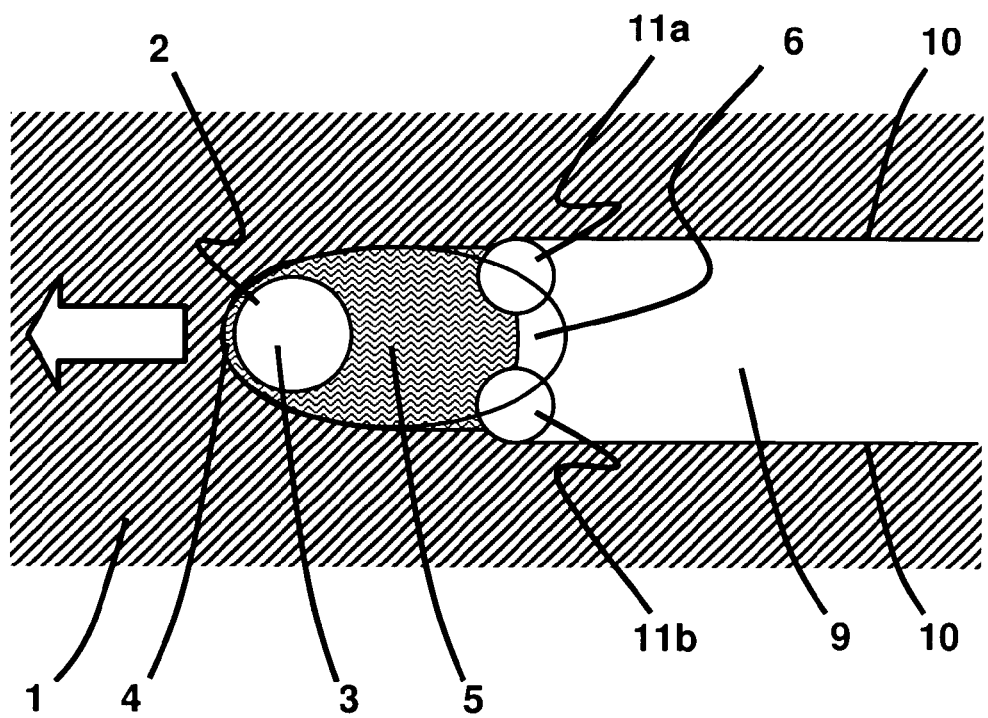
FIG. 11 a top view of a laser cutting process according to a further embodiment of the invention, FIG. 12 a cross section through a multiple beam laser cutting process according to a further embodiment of the invention, FIG. 13 a top view of keyholes and melt-pool as generated by a lateral arrangement of processing beams, FIG. 14 a cross-section through a longitudinal in-line arrangement of laser beams in a cutting process according to a further embodiment of the invention, FIG. 15 a cross-section through a longitudinal in-line arrangement of laser beams in a cutting process according to a further embodiment of the invention, FIG. 16 a top view of a p-polarised melting beam according to a further embodiment of the invention FIG. 17 a top view of an s-polarised melting beam according to a further embodiment of the invention.

The above-mentioned embodiments may also be combined to a laser cutting process using four laser beams as shown in FIG. 11 in a top view. A high intensity laser beam 2 melts and evaporates the material of the work piece 1 to form a keyhole 3 and a melt pool 5. The cut-front 4 propagates through the work piece 1 as the melting beam 2 is advanced through the work piece 1 dragging a melt pool 5 behind. A melt ejection beam 6 is arranged to essentially cover the melt 5 generated by the melting beam 2 to eject a major part of the melt 5 from the work piece 1 forming a kerf 9. In addition to the central melt ejection beam 6 two further melt ejection beams 11a, 11b follow the melting beam 2 along the sidewalls 10 of the kerf 9 in order to eject remaining melt from the sidewalls 10 and trim the cut edges.

Figure 12:
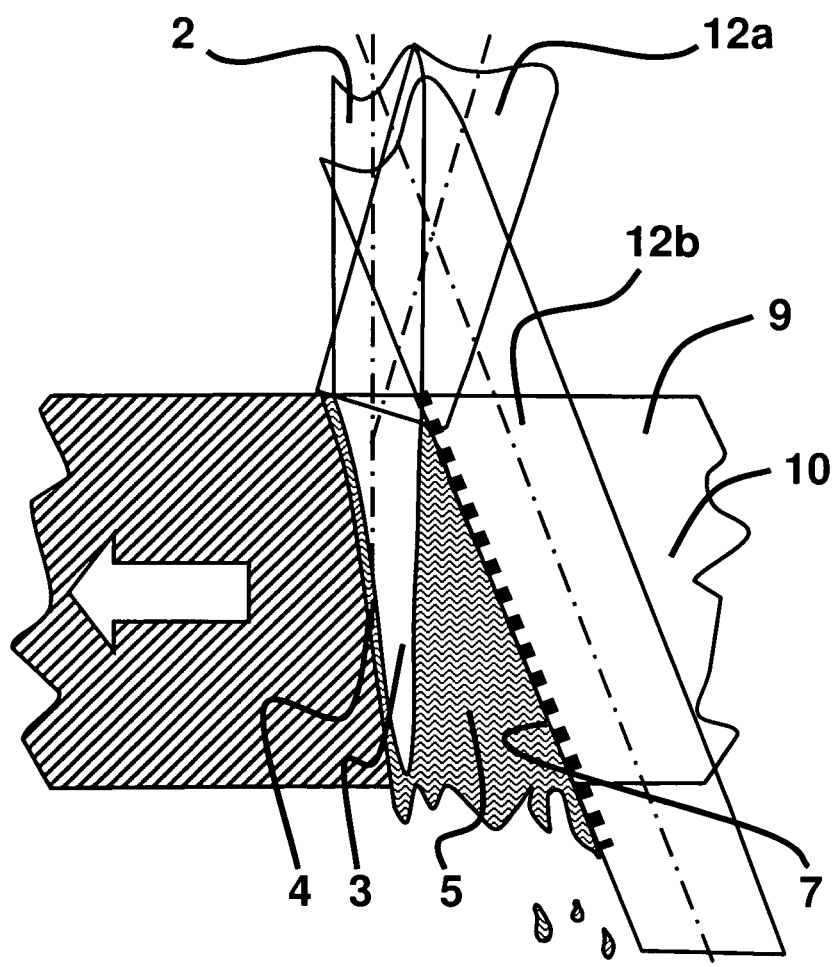

FIG. 12 shows a schematic cross section according to a further embodiment of the invention. The arrangement of melt ejection beams comprises two sub-beams: a first melt ejection beam 12a directed to the melt around the keyhole 3 in order to avoid melt 5 leaving the processing region in an upward direction, and a second melt ejection beam 12b arranged to follow the first melt ejection beam 12a in order to eject the melt 5 out of the kerf 9 in a downward direction. In practice, the first melt ejection beam 12a may be weaker in intensity than the second melt ejection beam 12b. Furthermore in practice, the first melt ejection beam 12a may be inclined to point in a forward direction in order to properly irradiate the melt 5 in and around the keyhole 3 and particularly at the cut-front 4. The second melt ejection beam 12b may be inclined to point in a backward direction establishing a melt pool surface 7 essentially parallel to the direction of the second melt ejection beam 12b.

Figure 13:
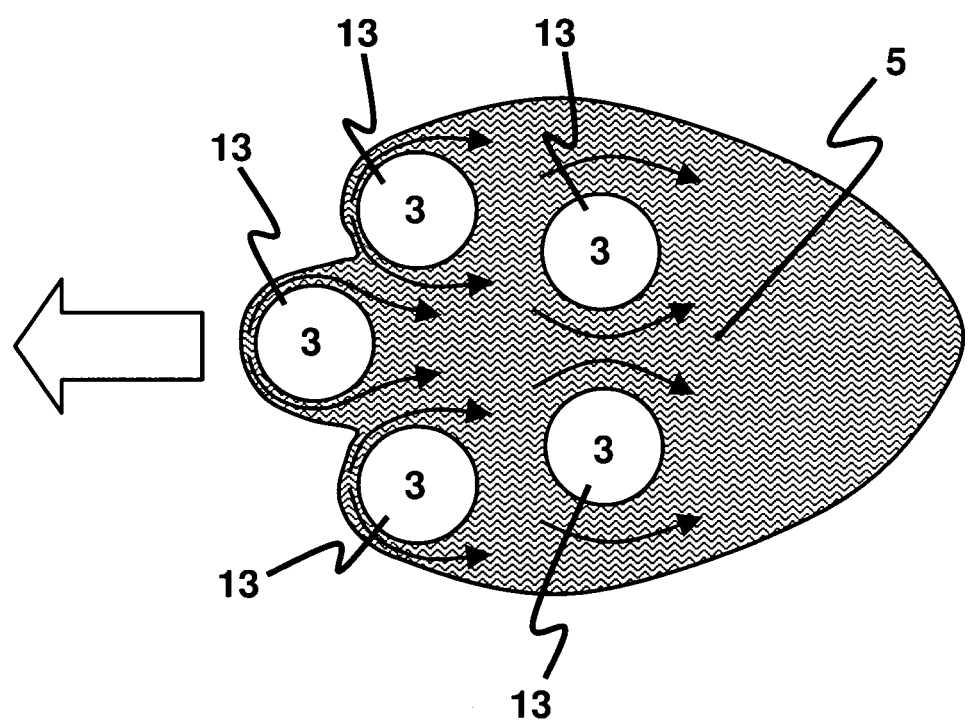

FIG. 13 shows a top view of a further embodiment of a laser processing arrangement according to the invention. A melt pool 5 is generated by a lateral arrangement of five melting sub-beams 13 advancing through a work piece 1 in a processing direction as indicated by the block arrow. Each of the lateral sub-beams 13 forms a keyhole 3. The melt 5 flows around the keyholes 3 as indicated by thin arrows. The lateral arrangement of keyholes 3 thereby acts like a sieve to control the flow while at the same time generating a large melt pool. It should be noted that the at least one melt ejection beam is not shown in FIG. 13.

The arrangement of five sub-beams as shown in FIG. 13 is only one example for a lateral arrangement according to the invention. Other numbers and topographic variations of the lateral arrangement will be obvious to a person skilled in the art.

Figure 14:
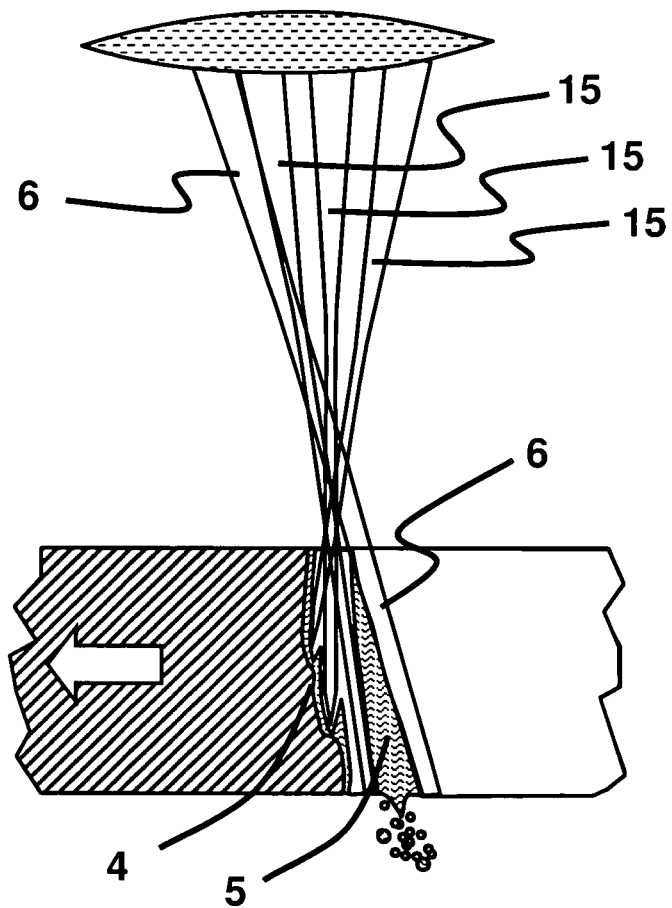
Figure 15:
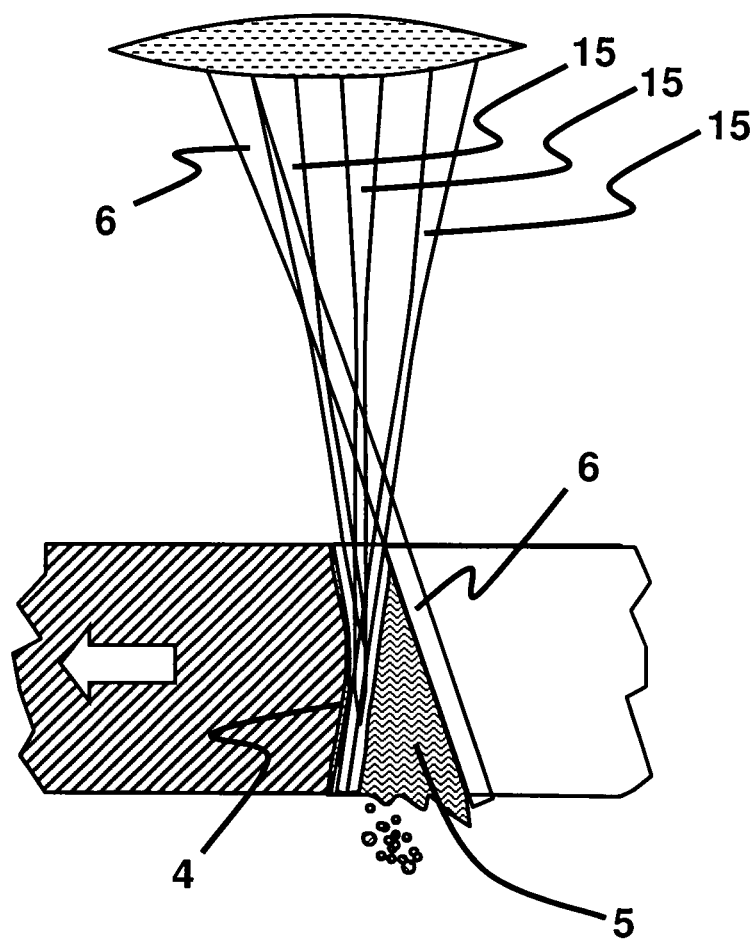

A further embodiment of a laser cutting process according to the invention with an advantageous arrangement of melting sub-beams is shown in FIG. 14 and FIG. 15. A number of melting sub-beams 16, here shown three sub-beams 15, are longitudinally arranged in line in a plane parallel to the cutting direction and are directed to the same keyhole 3. For illustration, a fourth beam is shown in FIG. 14 and FIG. 15 representing the at least one melt ejection beam 6.

In a further embodiment for a laser processing arrangement according to the invention the at least one melting beam and/or the at least one melt ejection beam is linearly polarised. Linear polarisation allows for optimising the coupling of the laser energy into the material of the at least one work piece 1 for heating, melting and/or melt-ejection.

Figure 16:
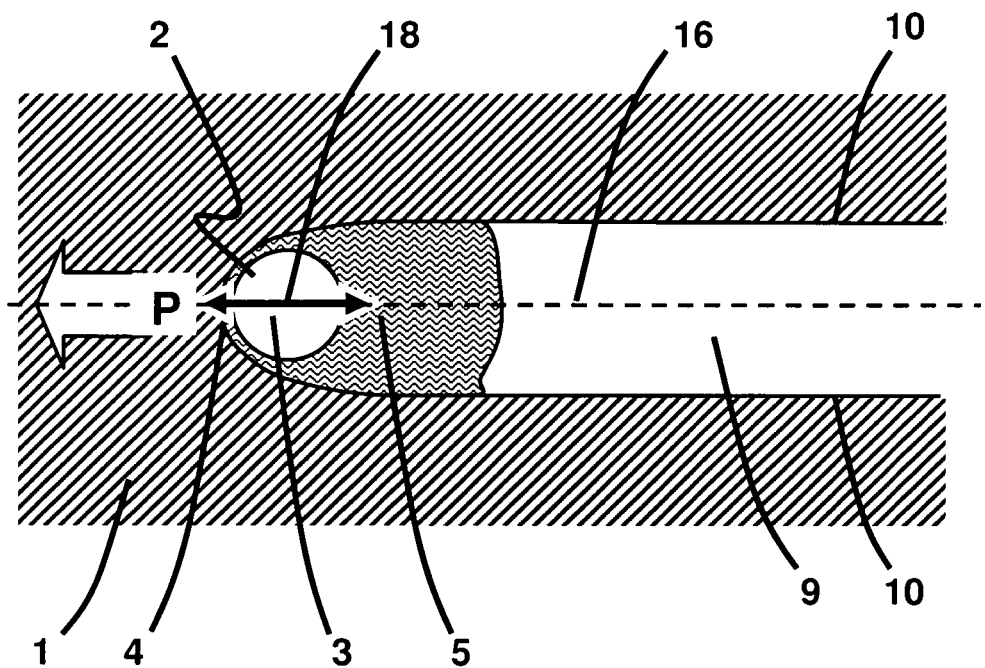

In the embodiment for a laser cutting process according to the invention shown in FIG. 16 a melting beam 2 is incident on a work piece 1 through a plane of incidence 16 which is aligned parallel to the cutting direction indicated by the block arrow. For clarity, only a melting beam 2 is shown in FIG. 16. The plane of incidence intersects the work piece 1 in the centre of the cut-front 4. The melting beam 2 is polarised in a direction parallel to the plane of incidence (p-polarisation, 18). P-polarisation 18 enhances the coupling of the melting beam 2 into the cut-front 4, thereby enhancing the cut-speed.

Figure 17:
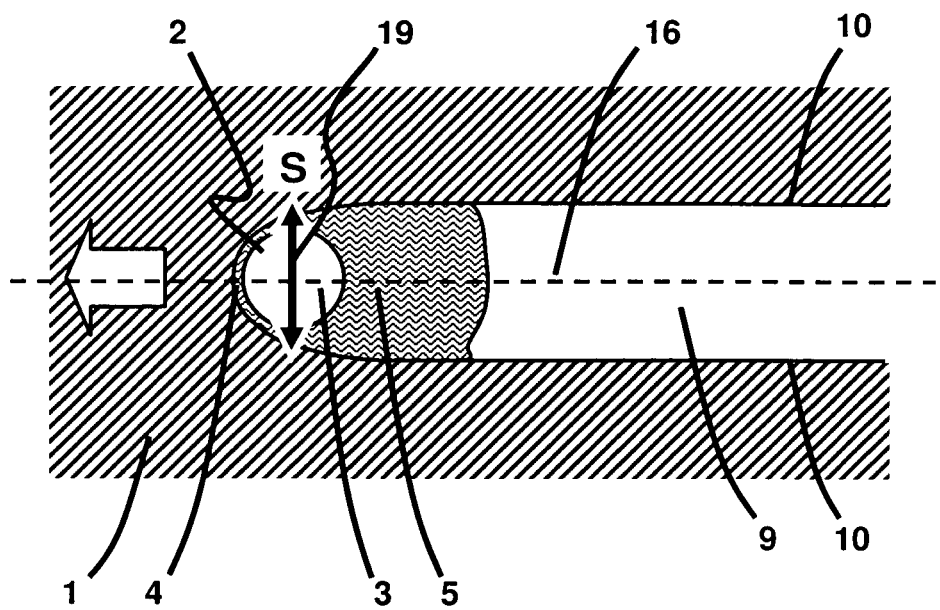

Similarly, FIG. 17 shows an embodiment according to the invention where the melting beam 2 is linearly polarised in a direction perpendicular to the plane of incidence (s-polarisation, 19). For clarity, only a melting beam 2 is shown in FIG. 17. S-polarisation 19 enhances the coupling of the melting beam 2 into the sidewalls 10 next to the melting beam 2, thereby obtaining a wider kerf 9.

Figure 18:
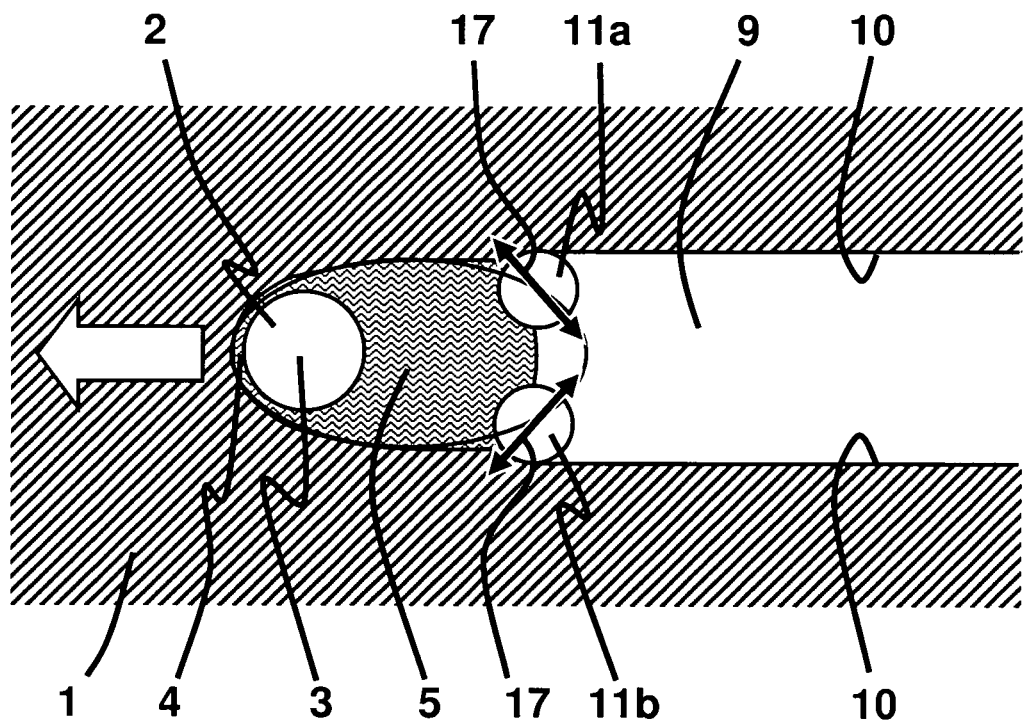
FIG. 18 a top view of a laser cutting process according to FIG. 11 with linearly polarised melt ejection beams.

FIG. 18 shows schematically a top view of the process according to FIG. 11 comprising a melting beam 2, a melt ejection beam 6, and additional melt ejection beams 11a, 11b for cut edge trimming, wherein the melt-ejection beams 11a, 11b for cut-edge trimming are linearly polarised. The polarisation direction of each of the melt ejection beams 11a, 11b is rotated with respect to the cutting direction to point into the work piece material in a forward direction at an angle between 0° and 90°, alternative between 30° and 60°, and preferably between 40° and 50°.

Figure 19:
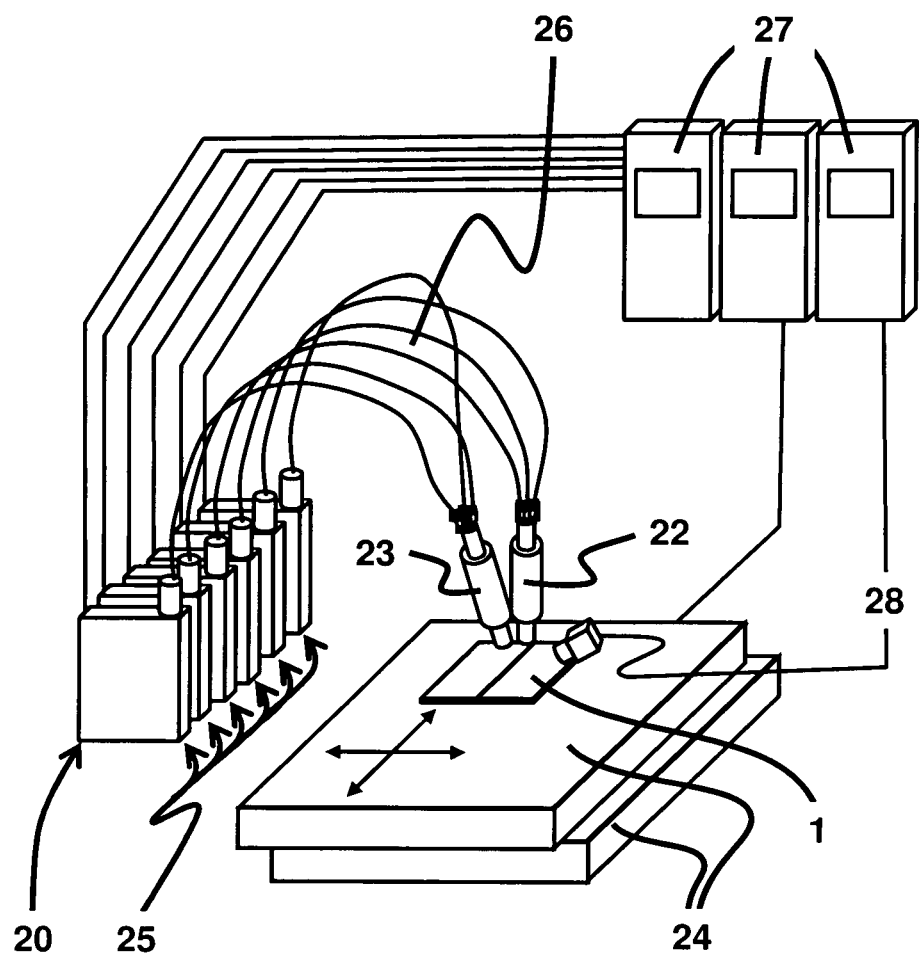
FIG. 19 a laser processing system according to one embodiment of the invention, FIG. 20 a laser processing system according to another embodiment of the invention, FIG. 21 a laser processing system according to a further embodiment of the invention, FIG. 22 optics for beam conditioning, rotation and focussing, FIG. 23 optical unit according to one embodiment of the invention, FIG. 24 optical unit according to another embodiment of the invention, FIG. 25 optical unit according to a further embodiment of the invention, FIG. 26 cross-section of a reflective polarising beam splitter in a plane of incidence, FIG. 27 cross-section through the separated beams along line A-A in FIG. 21.

A laser processing system according to one embodiment of the invention is shown in FIG. 19. The laser processing system comprises a laser beam emitting arrangement 20 emitting a number of laser beams, beam conditioning and focussing optical units 22, 23, and a motion arrangement 24. The Laser beam emitting arrangement comprises a number of laser units 25, such as fibre laser modules or a combination of different laser sources, and includes beam guidance means 26, such as passive optical fibres, for delivering the laser beams separately to the beam conditioning and focussing optical units 22, 23. Alternative, the laser beam emitting arrangement 20 may comprise beam-splitter optics (not shown) for splitting a laser beam into a number of laser beams that are arranged and coupled into the beam conditioning and focussing optical units 22, 23.

The embodiment shown in FIG. 19 has two optical units 22, 23 for beam conditioning and focussing, wherein each of the optical units 22, 23 through optical fibres 26 is supplied with three separate laser beams. By means of the beam conditioning optics 22, 23, the laser beams are combined to an energy distribution that is tailored to the processing application, such as cuffing or welding, and focussed onto the work piece 1. The optical unit 22 provides the at least one first laser beam, the so-called melting beam, which is adapted to melt the work piece material and form a keyhole, and the other optical unit 23 provides the at least one second laser beam, which for example in a cutting application may be the so-called melt ejection beam, which is adapted to heat selected surface regions of the melt, whereby material is evaporated from the surface of the material generating an evaporation-pressure for forcing the melt out of the processing region.

The work piece 1 is arranged on a work table that is provided with a motion arrangement 24. such as translation and/or rotation stages, for moving the work piece 1 with respect to the optical units 22, 23. It should be noted that the motion arrangement 24 may also be adapted to moving the optical units 22, 23 with respect to a fixed work piece. Alternatively the optical units 22, 23 may be provided with a remote scanning optics for scanning the laser beams over the work piece 1. A control unit 27 is provided to simultaneously control the laser beam emitting arrangement 20, optical units 22, 23, and motion arrangement 24 in order to process a work piece 1 along a desired processing curve.

An optional monitoring unit 28, such as a camera, a line camera, a photo sensor, an array of photo sensors, or alike, allows for monitoring the laser cutting process. Alternative to the off-axis arrangement as shown in FIG. 19, the monitoring unit 28 may be arranged in-line and/or integrated with at least one of the optical units 22, 23.

Figure 20:
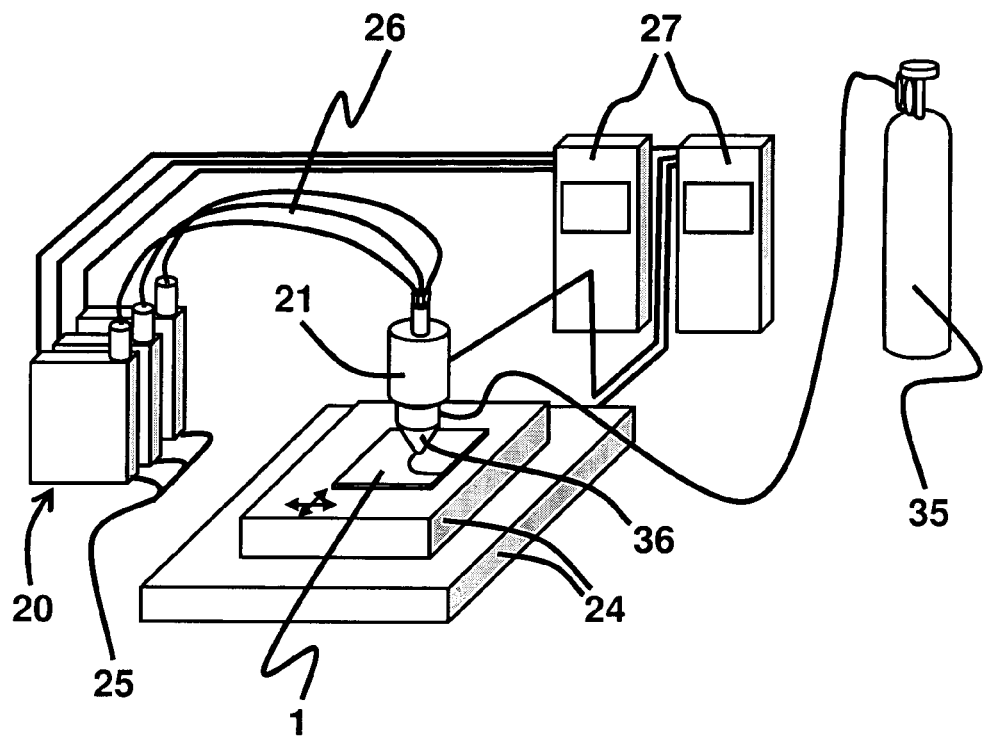
Figure 21:
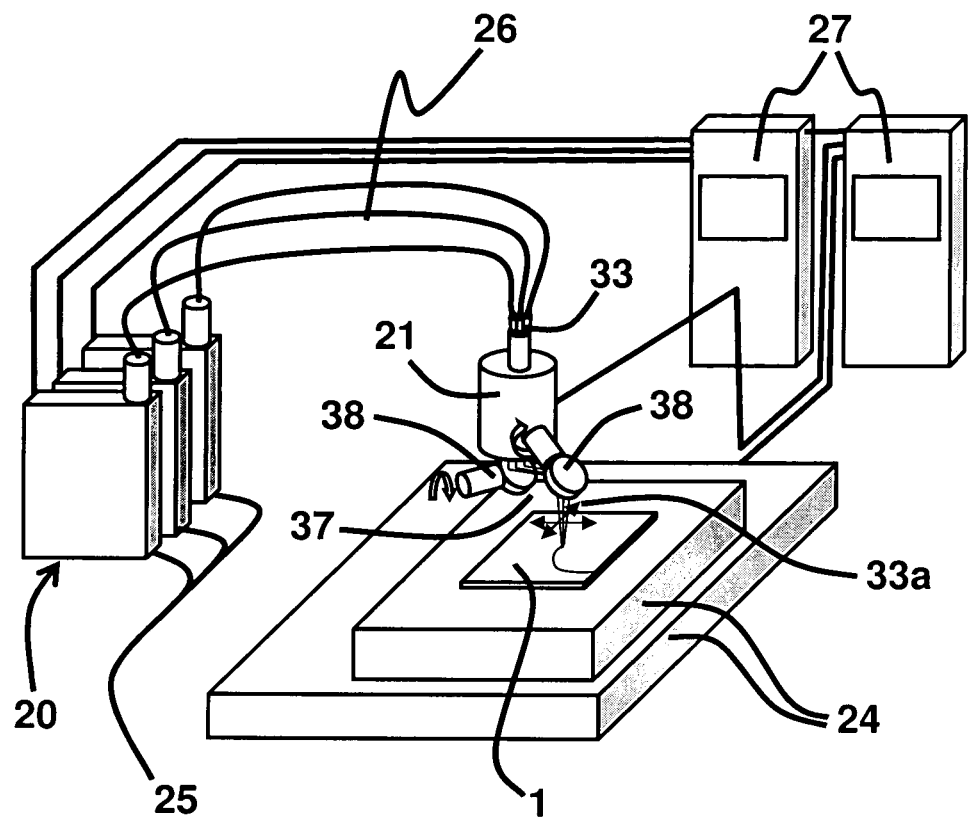
Figure 22:
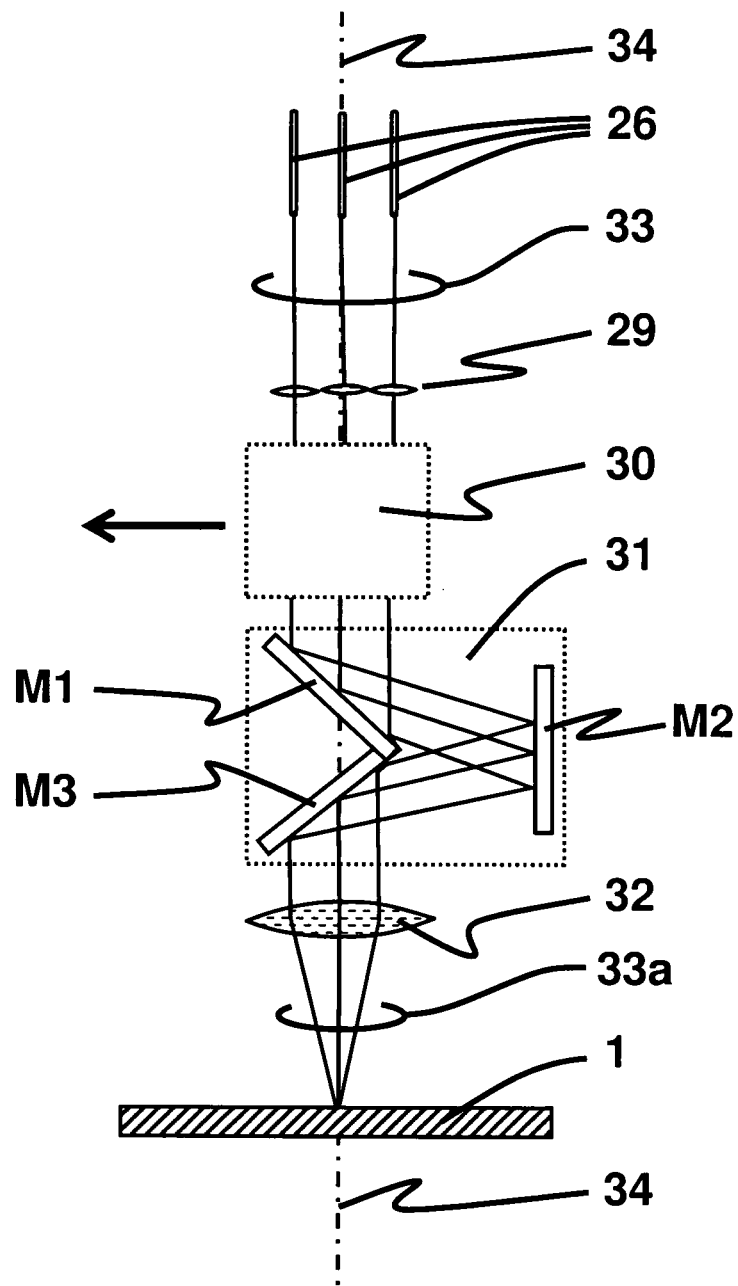

Reference is now made to FIGS. 20-22. In practice it may be desirable to provide the at least one melting beam 2 and the at least one melt ejection beam 6 through a single optical unit 21. FIG. 20 shows a further embodiment of a laser processing system according to the invention, wherein the laser beams 33a are provided through a single optical unit 21. Referring to FIG. 22, the optical unit 21 may comprise collimators 29, optical isolator elements 30, such as Faraday rotators, a rotatable mirror system 31 or motorised beam and polarisation rotators, and focussing optics 32. The system also comprises an assist gas supply 35. The assist gas may be provided off-axis with respect to the laser beams 33a through a separate nozzle or, as shown in FIG. 20, through a gas nozzle 36 that is arranged at the end of the optical unit 21 facing the work piece 1 and essentially concentric around the laser beams 33a.

FIG. 21 shows a further embodiment of a laser processing system according to the invention. The system has a single optical unit 21. Referring to FIG. 22, the optical unit 21 may comprise collimators 29, optical isolator elements 30, such as Faraday rotators, motorised beam and polarisation rotators, such as a rotatable mirror system 31, and focussing optics 32.

The system shown in FIG. 21 is adapted to work without the use of assist gas. A remote scanning optics 37, such as motorised and computer controlled mirrors 38, is arranged between the optical unit 21 and the work piece 1. The remote scanning optics 37 is in combination with a computer control 27 adapted to move the lasers beams 33a over the work piece 1 surface along a processing curve. In addition to and/or in combination with the movement of the laser beams 33a with respect to the work piece 1 provided by the remote scanning optics 37, a further movement may be provided by means of a motion arrangement 24. The motion arrangement 24 may comprise means for moving the work piece, such as a multiple axis motorised work table as illustrated in FIG. 21, and or/means for moving the optics, such as a robotic arm or on a Cartesian gantry system (not shown).

FIG. 22 shows an example of a beam conditioning and focussing optics 21 according to one embodiment of a laser processing system according to the invention. Three optical fibres 26 emit linearly polarised laser beams 33. Collimator optics 29 collimates and guides the laser beams 33 into an optical isolator element 30 that is adapted to prevent back-reflected light from propagating back and damage optical components in the laser cutting system.

In practice, said collimator optics 29 may comprise a collimator lens for each optical fibre 26, said collimator lens being adapted to collimate the diverging laser light 33 emerging from the end of the optical fibre 26 into a parallel beam, wherein after collimation, the laser beams are arranged to propagate essentially parallel to each other.

Said optical isolator element 30 may comprise a Faraday rotator that is adapted to selectively redirect polarised back-reflected light, for example towards a beam dump as indicated by the arrow. In a system operating with a number of different laser beams with different polarisations, the optical isolator element 30 may comprise a plurality of Faraday rotators, one for each polarisation.

A mirror system 31 is arranged to rotate the image and polarisation of the laser beams emerging from the optical isolator 30 around an optical axis 34.

The laser beams leaving the optical isolator 30 enter the mirror system 31 in a direction essentially parallel to the optical axis 34. A first mirror M1 is arranged on the optical axis 34 to deflect the laser beams by an angle slightly larger than ninety degrees onto a second mirror M2 which is placed at a distance from the optical axis 34 with its surface normal pointing towards the optical axis 34. The second mirror M2 is adapted to reflect the laser beams to a third mirror M3 which is arranged on the optical axis 34 in order to deflect the laser beams such that they again follow the direction of the optical axis 34. By rotating the mirror system 31 around the optical axis 34, the image of the laser beams 33a leaving the mirror system 31 is rotated with respect to the corresponding image of the laser beams 33 entering the mirror system 31.

Finally, the laser beams 33a leaving the mirror system 31 are focussed onto the work piece 1 by a focussing optics 32.

Figure 23:
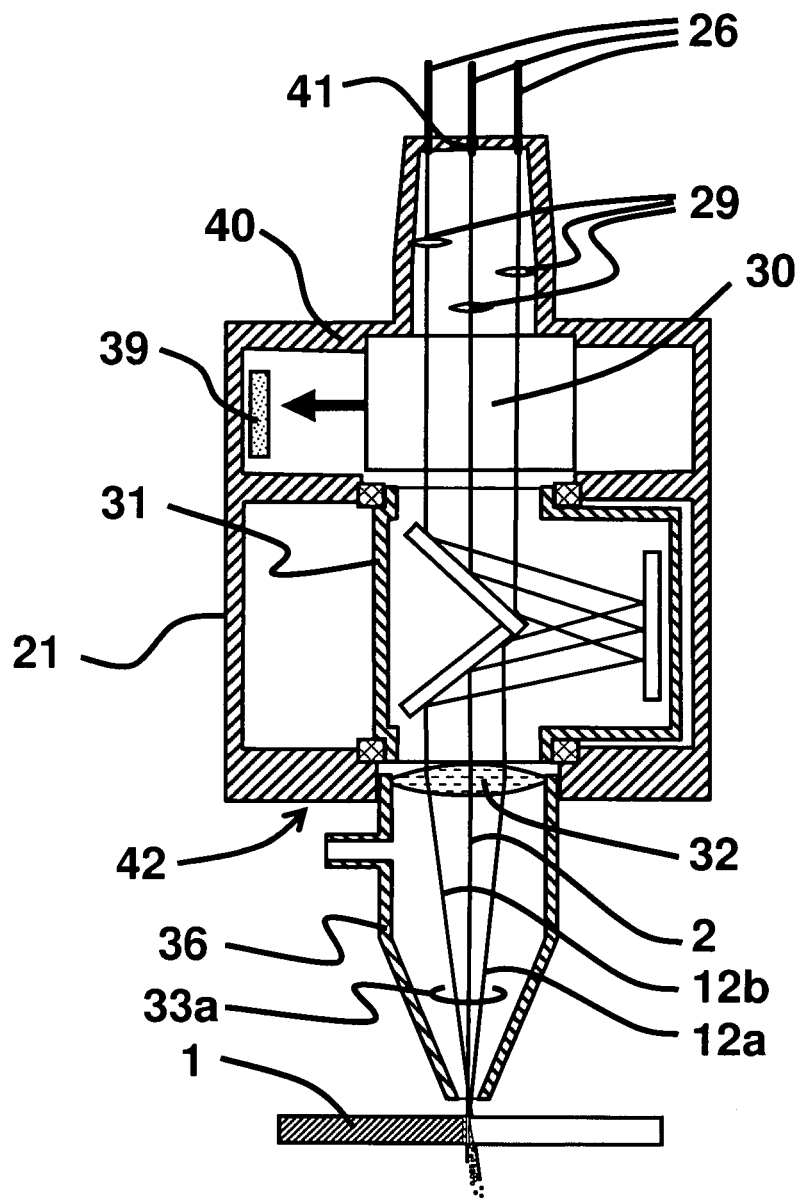
Figure 24:
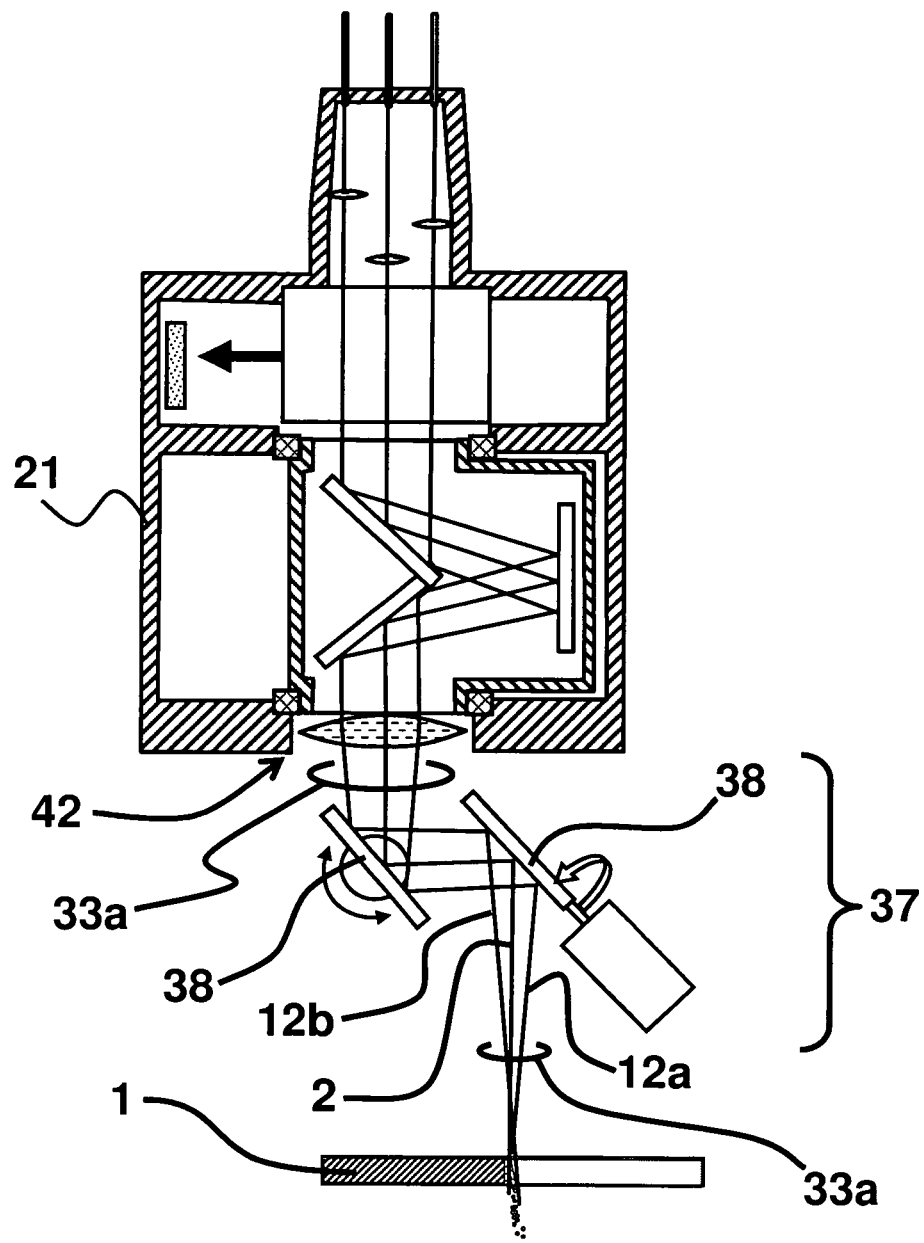
Figure 25:
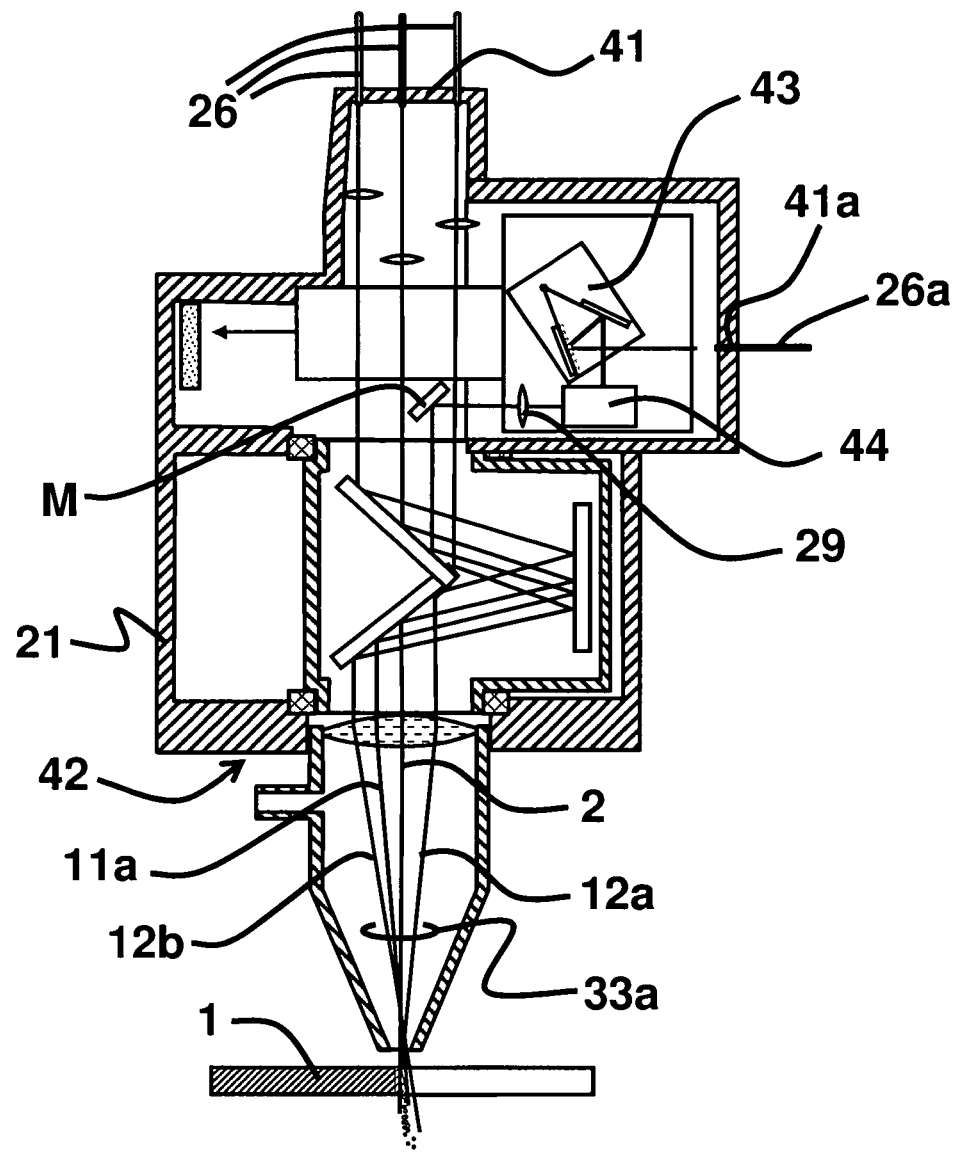

Reference is now made to FIGS. 23-25. In a preferred embodiment according to the invention all laser beams 33a are provided via a single optical unit 21. The single optical unit 21 integrates essentially all required beam conditioning and focussing functions as well as handles the building of a desired energy distribution to be projected onto the processing region. In practice a single optical unit 21 acts as a laser processing head that may be detachably fixed on a laser processing system according to the invention. The laser processing head may comprise adjustable features for process control, and/or be designed for a given type of process, such as thin plate cutting, cutting in thick plates, heavy section welding, butt welding, welding of different materials, or alike.

In the following, a number of optical units are described as laser cutting type processing heads. It should be noted that the shown embodiments also may be used for welding applications.

FIG. 23 shows an optical unit 21 for laser cutting. Laser beams are delivered to the optical unit 21 via beam guidance means 26, such as optical fibres, connected to optical input ports 41 to enter a housing 40 of the optical unit 21. The housing 40 comprises optical elements as described with reference to FIG. 22, more specifically collimating optics 29, preferably one for each optical fibre, optical isolator units 30, such as Faraday-rotators, and an associated beam dump 39, rotatable mirror optics 31, and focussing means 32 at an output end 42. The optical unit 21 is thus adapted to provide a laser beam arrangement as shown in FIG. 12 with a centrally arranged melting beam 2 for keyhole formation, a primary melt ejection beam 12b that is tilted to point in a slightly backward direction, and a so-called surface melt ejection beam 12a that is directed towards the melting beam 2 spot on the work piece 1 surface and tilted to point in a slightly forward direction. Assist gas 35 may be provided through a gas nozzle 36 that is essentially coaxially arranged around the ensemble of laser beams 2, 12a, 12b. In a simpler embodiment corresponding to the process shown in FIG. 2 the surface melt ejection beam 12a and the corresponding optics may be omitted.

FIG. 24 shows a laser processing head adapted for remote scanning without assist gas 35 and is a variation of the laser cutting head shown in FIG. 23. Instead of the assist gas nozzle 36 remote scanning means 37 comprising motorised and computer controlled mirrors 38 is arranged at the optical out put end 42 of the optical unit 21. Optionally, assist gas may be applied through an off-axis nozzle (not shown). The laser processing head for remote scanning may for example be used in a system according to FIG. 21.

FIG. 25 shows a further development of the laser processing head according to FIG. 23. The laser processing head is adapted to provide a laser processing beam arrangement with five beams. In addition to the melting beam 2, the primary melt ejection beam 12b and the surface melt ejection beam 12a, laterally arranged edge trimming beams 11a and 11b (not shown) may be provided via the optical unit 21. The edge trimming beams 11a, 11b are generated from a single laser beam provided through beam guidance means 26a and coupled into the optical unit 21 through an optical input port 41a. The single laser beam is split into two orthogonally polarised beams 49, 50 by means of a polarising beam splitter. The two beams 49, 50 are arranged with an adjustable mutual interspacing in a lateral direction, i.e. out of the drawing plane of FIG. 25. The polarising beam splitter 43 may for example split the incoming beam 48 by means of reflection from a thin film system 45, 46, 47 as explained below with reference to FIG. 26. The polarisation of the two orthogonally polarised beams 49, 50 may be rotated by means of a polarisation controller 44 to obtain edge trimming beams 11a, 11b of the desired orientation of the linear polarisation 17, such as shown in FIG. 18. Via a mirror M the edge trimming beams 11a, 11b are coupled into the beam path of the three other laser beams 2, 12a, 12b. The ensemble of five processing beams is then collectively projected and focussed onto the work piece 1 as described above with reference to FIG. 22. Assist gas 35 may be applied through a gas nozzle 36 that is coaxially arranged around the ensemble of laser beams at the out put end 42 of the optical unit 21.

It should be noted that the optical unit shown in FIG. 25 in analogy to the optical units shown in FIG. 23 and FIG. 24 and described above also may be combined with a remote scanning optics 37 arranged at the output end 42 of the optical unit 21.

Figure 26:
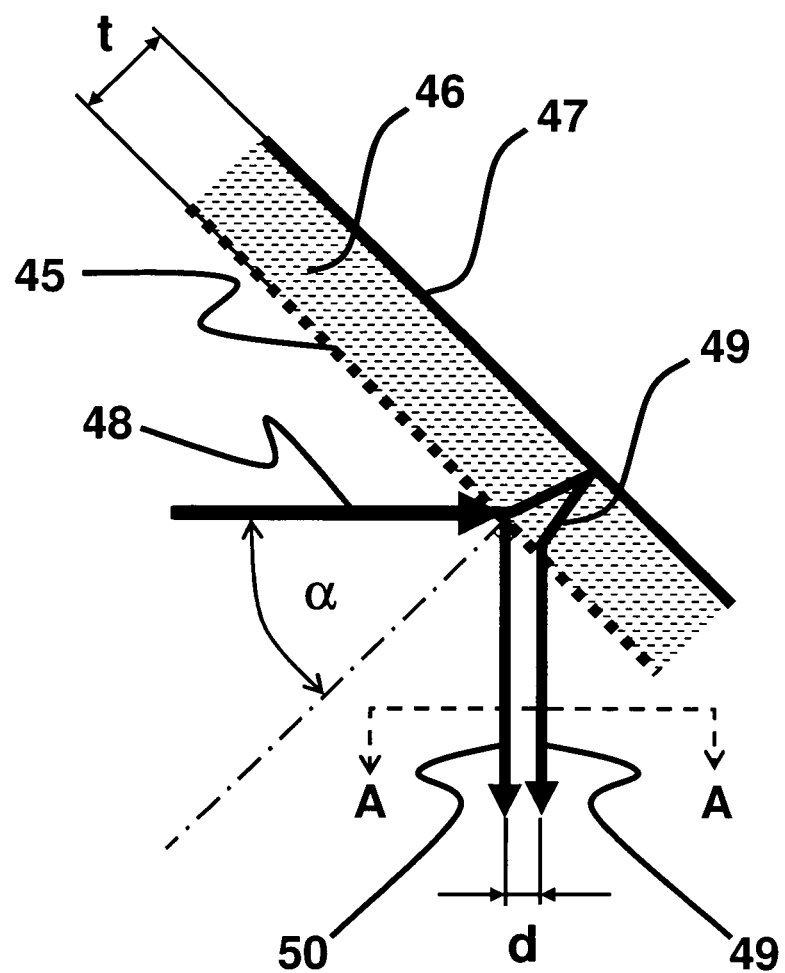

FIG. 26 shows a thin film layer system adapted to split an incoming beam 48 into two orthogonally polarised beams 49, 50. The incoming beam 48 first hits a polarisation selective coating 45 at an angle of incidence α. The polarisation selective coating directly reflects a first beam 49 with a first linear polarisation (X-polarisation) and transmits a second beam 50 with a second linear polarisation (Y-polarisation) orthogonal to the first polarisation. The second beam is diffracted into a transparent layer 46 of thickness t according to Snell's law, reflected at a high reflection surface 47 on the backside of the transparent layer 47, and diffracted out of the transparent layer 46 to propagate parallel to the first beam 49 displaced by a distance d with respect to first beam 49 in the plane of incidence of the incoming beam 48. The distance d depends on the angle of incidence α, the thickness t and the refractive index of the transparent layer 46 and the surrounding medium. Rotating the thin film layer system with respect to the incoming beam therefore allows adjusting the distance d, while the choice of the layer 46 thickness t and the refractive index determines an adjustment range.

Figure 27:
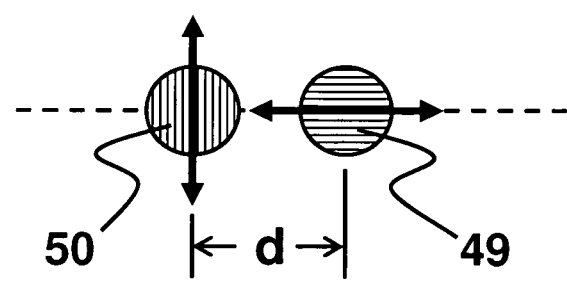

A cross-section of the mutually interspaced beams 49, 50 along line A-A in FIG. 26 is shown in FIG. 27.

By cascading beam splitter components 43 a multitude of mutually interspaced high intensity beams may be provided with adjustable mutual distances. Such an arrangement may therefore also be suited for providing for example an arrangement of sub-beams for primary melt ejection.

The invention has been described with reference to preferred embodiments. However, the scope of the invention is not limited to the illustrated embodiments, and alterations and modifications can be carried out without deviating from said scope of the invention.

LIST OF REFERENCE NUMBERS 1 work piece
2 melting beam
3 keyhole
4 cut-front
5 melt
6, 6a, 6b melt ejection beam
7 melt surface
8 Knudsen layer
9 kerf
10 sidewall
11a, 11b melt ejection beams
12a, 12b melt ejection beams
13 lateral sub-beam
15 longitudinal sub-beam
16 plane of incidence
17 linear polarisation
18 p-polarisation
19 s-polarisation
20 laser beam emitting arrangement
21, 22, 23 optical unit
24 motion arrangement
25 laser units
26, 26a beam guidance means
27 control unit
28 monitoring system
29 collimator
30 optical isolator
31 rotating mirror optics
32 focussing optics
33, 33a laser beams
34 optical axis
35 assist gas supply
36 gas nozzle
37 remote scanning optics
38 motorised mirror
39 beam dump
40 housing
41, 41a optical input ports
42 optical output end
43 polarising beam splitter
44 polarisation controller
45 polarisation selecting coating
46 transmitting layer
47 highly reflecting surface
48 incoming beam
49 reflected beam, X-polarised
50 reflected beam, Y-polarised
60 melt ejection sub-beam
61 outermost melt-ejection sub-beam
62a, 62b melt ejection sub-beam with a line-focus
63 additional melt ejection sub-beam
64 U-shape cross-section
65a, 65b melt control beams
M, M1, M2, M3 mirrors
AG assist gas induced melt flow
α angle of incidence
t thickness of transmitting layer
d beam separation

The invention claimed is:

1. A method for laser cutting of a work piece using multiple laser beams guided to a processing region, comprising:
generating a melt and forming a keyhole in a work piece using a first laser beam in a cutting direction parallel to a plane of a surface of the work piece;
guiding at least a second laser beam onto selected surface regions of the melt in a position separated from the first laser beam in a direction perpendicular to the cutting direction, and arranged to follow the first laser beam along sidewalls of a kerf formed by the first laser beam; and
evaporating material from the melt using the second laser beam, thereby forming a shaped melt flow barrier with a controlled high pressure in a Knudsen layer such that at least a part of the melt is forced out of the processing region in a way that forms a kerf having a cut front and sidewalls,
wherein the first laser beam is guided in front of the second laser beam on the surface of the work piece, in the cutting direction.

2. The method according to claim 1, further comprising the step of guiding the second laser beam onto selected surface regions behind the first laser beam.

3. The method according to claim 2, further comprising the step of using the second laser beam to form a melt flow barrier extending transversely of the cutting direction and having a width corresponding to the kerf.

4. The method according to claim 3, wherein the second laser beam forms a melt flow barrier having a concave surface on a side facing towards the first laser beam.

5. The method according to claim 3, wherein the melt flow barrier has a V-shaped cross-section.

6. The method according to claim 3, further comprising the step of forming the melt flow barrier with an arrangement of overlapping sub-beams.

7. The method according to claim 5, further comprising the step of forming the concave melt flow barrier with a V-shape arrangement of overlapping sub-beams comprising at least one first sub-beam having an oblong cross-section forming a first leg of the V-shape, and at least one second sub-beam having an oblong cross-section forming a second leg of the V-shape.

8. The method according to claim 3, wherein the second laser beam is provided through a diffractive optical element (DOE).

9. The method according to claim 3, further comprising the step of providing at least two additional laser beams which follow the second laser beam in the cutting direction in a staggered arrangement, the at least two additional laser beams forming a melt flow barrier extending transversely of the cutting direction and having a width corresponding to the kerf.

10. The method according to claim 1, further comprising the step of forming an inwardly directed flow of melt by following the first laser beam along the sidewalls of the kerf with at least two melt control beams.

11. The method according to claim 1, wherein the second laser beam further comprises at least two additional beams which follow the first laser beam along the sidewalls of the kerf.

12. The method according to claim 11, wherein the at least two additional beams have a beam parameter product selected from the group consisting of less than 10 mm*mrad, less than 5 mm*mrad, less than 1 mm*mrad, and less than 0.5 mm*mrad.

13. The method according to claim 11, wherein each of the at least two additional beams have an instantaneous power fluctuating around an average power, wherein a deviation of instantaneous power from the average power is selected from the group consisting of less than 10%, less than 5%, less than 1%, and less than 0.5% of the average power.

14. The method according to claim 11, wherein each of the at least two additional beams have an instantaneous spatial power density distribution fluctuating around an average power density distribution, wherein a deviation of the instantaneous spatial power density distribution from the average spatial power density distribution in each point is selected from the group consisting of less than 10%, less than 5%, less than 1%, and less than 0.5% of the average power density distribution in that point.

15. The method according to according to claim 11, wherein the at least two additional are provided from a fibre laser or a disc laser.

16. The method according to claim 1, wherein at least one of the first laser beam and the second laser beam has a beam parameter product selected from the group consisting of less than 10 mm*mrad, less than 5 mm*mrad, less than 1 mm*mrad, and less than 0.5 mm*mrad.

17. The method according to claim 16, wherein at least one of the first laser beam and the second laser beam has an instantaneous power fluctuating around an average power, wherein a deviation of the instantaneous power from the average power is selected from the group consisting of less than 10%, less than 5%, less than 1%, and less than 0.5% of the average power.

18. The method according to claim 16, wherein at least one of the first laser beam and the second laser beam has an instantaneous spatial power density distribution fluctuating around an average power density distribution, wherein the deviation of the instantaneous spatial power density distribution from the average spatial power density distribution in each point is selected from the group consisting of less than 10%, less than 5%, less than 1%, and less than 0.5% of the average energy density distribution in that point.

19. The method according to claim 1, wherein at least one of the first laser beam and the second laser beam is provided by a fibre-laser or a disc-laser.

20. The method according to claim 1, wherein the first laser beam comprises a number of laterally arranged sub-beams.

21. The method according to claim 20, wherein each lateral sub-beam generates a separate keyhole.

22. The method according to claim 1, wherein the first laser beam further comprises a number of sub-beams longitudinally arranged in line with the cutting direction and directed to the keyhole.

23. The method according to claim 22, wherein focal spots of the longitudinally arranged sub-beams are in different vertical levels of the work piece.

24. The method according to claim 1, wherein energy from at least one laser beam is provided in pulses.

25. The method according to claim 1, wherein at least one laser beam is linearly polarised.

26. The method according to claim 25, wherein the first laser beam is linearly polarised in a direction parallel to a plane of incidence of the first laser beam, wherein the plane of incidence at each instant is aligned with a cutting direction.

27. The method according to claim 25, wherein the first laser beam is linearly polarised in a direction perpendicular to a plane of incidence of the first laser beam, wherein the plane of incidence at each instant is aligned with a cutting direction.

28. The method according to claim 25, wherein the linear polarisation of the first laser beam is controlled as a function of an angle enclosed by the plane of incidence and at least one of a cutting direction and an angle of incidence, wherein the angle of incidence and the plane of incidence are defined with respect to a work piece surface normal.

29. The method according to claim 25, wherein at least one laser beam is linearly polarised at a fixed angle with respect to a plane of incidence, an absolute value of said angle selected from the group consisting of between 0° and 90°, between 30° and 60°, and between 40° and 50°, wherein the plane of incidence is defined with respect to a work piece surface normal.

30. The method according to claim 25, wherein the linear polarisation of the at least one laser beam is controlled as a function of laser cutting process parameters, said laser cutting process parameters comprising an angle enclosed by a plane of incidence and at least one of a cutting direction and the angle of incidence, wherein the angle of incidence and the plane of incidence are defined with respect to a work piece surface normal.

31. The method according to claim 1, wherein the method further comprises providing an assist gas jet directed towards the processing region.

32. A system for laser cutting of a work piece, comprising:
- a laser beam emitting apparatus configured to guide multiple laser beams to a processing region via at least one optical unit; and
- a motion apparatus configured to move the multiple laser beams relative to the work piece, wherein:
- a first laser beam is configured to melt the work piece material and form a keyhole; and
- at least a second laser beam is configured to heat selected surface regions of the melt in a position separated from the first laser beam and arranged with respect to the first laser beam such that when the first laser beam moves in a cutting direction, the second laser beam follows the first laser beam along sidewalls of a kerf formed by the first laser beam, so as to evaporate material from the surface of the melt and thereby form a shaped melt flow barrier with a controlled high pressure in a Knudsen layer such that at least a part of the melt is forced out of the processing region in a way that forms a kerf having a cut front and sidewalls,
- wherein the first laser beam is guided in front of the second laser beam on the surface of the work piece, in the cutting direction.

33. The system according to claim 32, wherein the at least a second laser beam further comprises at least two additional beams which follow the first laser beam along the sidewalls of the kerf.

34. The system according to claim 32, further comprising at least a third and fourth additional beams which follow the first laser beam along the sidewalls of the kerf and form an inwardly directed flow of melt.

35. The system according to claim 32, wherein the laser beam emitting apparatus further comprises at least two laser units each emitting at least one laser beam.

36. The system according to claim 32, wherein the laser beam emitting apparatus further comprises:
   at least one laser configured to emit at least one laser beam; and
   a beam splitter configured to split the at least one laser beam into two or more beams.

37. The system according to claim 32, wherein the laser beam emitting apparatus further comprises at least one laser unit emitting a beam having a beam parameter product selected from the group consisting of less than 10 mm*mrad, less than 5 mm*mrad, less than 1 mm*mrad, and less than 0.5 mm*mrad.

38. The system according to claim 32, wherein at least one laser beam is provided by at least one of a fibre laser and a disc laser.

39. The system according to claim 32, further comprising means for providing an assist gas jet to the processing region.

40. The system according to claim 32, wherein the at least one optical unit is configured for collectively rotating at least one laser beam with respect to the at least one work piece around an axis perpendicular to a work piece surface at the processing region.

41. The system according to claim 32, wherein the optical unit further comprises:
   at least one optical input port;
   beam collimating optics;
   means for collectively rotating the at least one laser beam; and
   focusing optics at an output end of the optical unit.

42. The system according to claim 41, wherein the optical unit further comprises:
   a beam splitter;
   polarisation rotating elements; and
   an optical isolator unit comprising at least one Faraday rotator arranged between the collimating optics and the means for collectively rotating the at least one laser beam.

43. The system according to claim 41, wherein the optical unit further comprises:
   means for providing an assist gas jet directed to the processing region, said means arranged concentrically around the at least one laser beam at an output end of the optical unit.

44. The system according to claim 41, further comprising computer controlled scanning optics at the output end of the optical unit, said scanning optics configured to deflect the at least one laser beam through focussing optics.

45. A method for laser cutting of a work piece using multiple laser beams guided to a processing region, comprising:
   generating a melt and forming a keyhole in a work piece using a first laser beam in a cutting direction parallel to a plane of a surface of the work piece;
   guiding at least a second laser beam onto selected surface regions of the melt in a position separated from the first laser beam in a direction perpendicular to the cutting direction, and arranged to follow the first laser beam along sidewalk of a kerf formed by the first laser beam; and
   evaporating material from the melt using the second laser beam, thereby forming a v-shaped melt flow barrier with a controlled high pressure in a Knudsen layer such that at least a part of the melt is forced out of the processing region in a way that forms a kerf having a cut front and sidewalls,
   wherein the first laser beam is guided in front of the second laser beam on the surface of the work piece, in the cutting direction,
   and wherein the first and second laser beams provide a Gaussian beam profile having a diameter exceeding a melt pool width, such that a power density in at a wing of the Gaussian beam profile lying outside the melt pool corresponding to the second laser beam does not exceed a threshold for melting solid work piece material of the workpiece while a remaining core of the Gaussian beam provides a power density sufficient to evaporate material from the melt in order to eject the melt from the kerf.

46. A method for laser cutting of a work piece using multiple laser beams guided to a processing region, comprising:
   generating a melt and forming a keyhole in a work piece using a first laser beam in a cutting direction parallel to a plane of a surface of the work piece;
   guiding at least a second laser beam onto selected surface regions of the melt in a position separated from the first laser beam in a direction perpendicular to the cutting direction, and arranged to follow the first laser beam along sidewalls of a kerf formed by the first laser beam; and
   evaporating material from the melt using the second laser beam, thereby forming a shaped melt flow barrier with a controlled high pressure in a Knudsen layer such that at least a part of the melt is forced out of the processing region in a way that forms a kerf having a cut front and sidewalls;
   wherein the second laser beam comprises at least two additional beams which follow the first laser beam along the sidewalls of the kerf, thereby reducing horizontal melt flow leakage along the sidewalls,
   wherein the first laser beam is guided in front of the second laser beam on the surface of the work piece, in the cutting direction,
   and wherein the first and second laser beams provide a Gaussian beam profile having a diameter exceeding a melt pool width, such that a power density in at a wing of the Gaussian beam profile lying outside the melt pool corresponding to the second laser beam does not exceed a threshold for melting solid work piece material of the workpiece while a remaining core of the Gaussian beam provides a power density sufficient to evaporate material from the melt in order to eject the melt from the kerf.

47. A method for laser cutting of a work piece using multiple laser beams guided to a processing region, comprising:
   generating a melt and forming a keyhole in a work piece using a first laser beam in a cutting direction parallel to a plane of a surface of the work piece;
   guiding at least a second laser beam onto selected surface regions of the melt in a position separated from the first laser beam in a direction perpendicular to the cutting direction, and arranged to follow the first laser beam along sidewalk of a kerf formed by the first laser beam, the second laser beam comprising at least two melt control beams; and evaporating material from the melt using the second laser beam, thereby forming an inwardly flow of melt by following the first laser beam along sidewalls of a kerf formed by a shaped melt flow barrier, wherein the first laser beam is guided in front of the second laser beam on the surface of the work piece, in the cutting direction, and wherein the first and second laser beams provide a Gaussian beam profile having a diameter exceeding a melt pool width, such that a power density in at a wing of the Gaussian beam profile lying outside the melt pool corresponding to the second laser beam does not exceed a threshold for melting solid work piece material of the workpiece while a remaining core of the Gaussian beam provides a power density sufficient to evaporate material from the melt in order to eject the melt from the kerf.

* * * * *